US012798297B2

(12) United States Patent
Agresti et al.

(10) Patent No.: US 12,798,297 B2
(45) Date of Patent: Nov. 17, 2026

(54) TYRE FOR VEHICLE WHEELS

(71) Applicant: Pirelli Tyre S.p.A., Milan (IT)

(72) Inventors: Simone Agresti, Milan (IT); Guido Luigi Daghini, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 0 days.

(21) Appl. No.: 19/384,674

(22) Filed: Nov. 10, 2025

(65) Prior Publication Data

US 2026/0061776 A1 Mar. 5, 2026

Related U.S. Application Data

(62) Division of application No. 18/001,350, filed as application No. PCT/IB2021/054680 on May 28, 2021, now Pat. No. 12,496,853.

(30) Foreign Application Priority Data

Jun. 17, 2020 (IT) ........................ 102020000014521

(51) Int. Cl.
*B60C 9/00* (2006.01)
*D02G 3/04* (2006.01)
(Continued)

(52) U.S. Cl.
CPC ............ *B60C 9/005* (2013.01); *B60C 9/0007* (2013.01); *B60C 9/0028* (2013.01);
(Continued)

(58) Field of Classification Search
CPC ... D02G 3/04; D02G 3/12; D02G 3/36; B60C 9/0007; B60C 9/0028; B60C 9/005; B60C 9/0064
See application file for complete search history.

(56) References Cited

U.S. PATENT DOCUMENTS 3,490,224 A * 1/1970 Bourgeas ............... H01B 7/182 57/244
3,699,768 A * 10/1972 Roberts ................ D07B 1/0633 57/244
(Continued)

FOREIGN PATENT DOCUMENTS

CN 105517814 A 4/2016
DE 102004036129 A 2/2006
(Continued)

OTHER PUBLICATIONS

International Search Report from the European Patent Office in corresponding International Application No. PCT/IB2021/054680 mailed Aug. 30, 2021.
(Continued)

*Primary Examiner* — Shaun R Hurley
(74) *Attorney, Agent, or Firm* — Finnegan, Henderson, Farabow, Garrett & Dunner, L.L.P.

(57) ABSTRACT

A tyre for vehicle wheels comprises a support structure and a tread band arranged in a radially outer position with respect to the support structure. The support structure comprises at least one reinforcing layer including a plurality of hybrid reinforcing cords each having a metallic wire twisted together with a multifilament textile yarn comprising a plurality of filaments. In any cross section of each of the hybrid reinforcing cords, the metallic wire is at least partially embedded in the filaments of the multifilament textile yarn.

13 Claims, 9 Drawing Sheets

(51) Int. Cl.
*D02G 3/48* (2006.01)
*D07B 1/06* (2006.01)

(52) U.S. Cl.
CPC ............. *B60C 9/0064* (2013.01); *D02G 3/04* (2013.01); *D02G 3/48* (2013.01); *D07B 1/0613* (2013.01); *B60C 2009/0092* (2013.01); *D07B 2201/104* (2013.01); *D07B 2201/2009* (2013.01); *D07B 2205/103* (2013.01); *D07B 2205/2028* (2013.01); *D07B 2205/2039* (2013.01); *D07B 2205/2046* (2013.01); *D07B 2205/3003* (2013.01); *D07B 2205/3025* (2013.01); *D07B 2501/2046* (2013.01)

(56) References Cited

U.S. PATENT DOCUMENTS

| | | | | |
|---|---|---|---|---|
| 3,722,440 | A * | 3/1973 | Igarashi | D03D 15/533 57/244 |
| 3,756,883 | A | 9/1973 | Gay | |
| 3,882,667 | A * | 5/1975 | Barry | D02G 3/441 57/244 |
| 3,977,174 | A | 8/1976 | Boileau | |
| 4,343,343 | A | 8/1982 | Reuter | |
| 5,383,507 | A | 1/1995 | Sato et al. | |
| 6,381,940 | B1 * | 5/2002 | Kolmes | D02G 3/12 57/220 |
| 7,222,481 | B2 | 5/2007 | Esnault et al. | |
| 7,594,380 | B2 | 9/2009 | Barguet et al. | |
| 8,166,741 | B2 | 5/2012 | Barguet et al. | |
| 8,375,692 | B2 * | 2/2013 | Rebouillat | D02G 3/48 57/210 |
| 9,983,747 | B2 * | 5/2018 | Poupyrev | G06F 3/04162 |
| 12,496,853 | B2 * | 12/2025 | Agresti | B60C 9/0007 |
| 2003/0051788 | A1 | 3/2003 | Besson et al. | |
| 2003/0209003 | A1 * | 11/2003 | Verstraeten | D02G 3/441 57/212 |
| 2009/0294029 | A1 | 12/2009 | Gotz et al. | |
| 2012/0180926 | A1 | 7/2012 | Rebouillat et al. | |
| 2015/0233027 | A1 | 8/2015 | Sung et al. | |
| 2020/0063296 | A1 * | 2/2020 | Ozden | D02G 3/441 |

FOREIGN PATENT DOCUMENTS

| | | | | |
|---|---|---|---|---|
| EP | 0 200 585 | A1 | 12/1986 | |
| EP | 0 329 590 | A1 | 8/1989 | |
| EP | 0 621 143 | A1 | 10/1994 | |
| EP | 2 000 585 | A1 | 12/2008 | |
| EP | 3 073 002 | A | 9/2016 | |
| EP | 3 196 343 | A1 | 7/2017 | |
| EP | 3569746 | A1 * | 11/2019 | D02G 3/12 |
| JP | 2010173437 | A * | 8/2010 | D07B 1/0606 |
| KR | 101403411 | B1 * | 6/2014 | D02G 3/38 |
| WO | 8000069 | A1 | 1/1980 | |
| WO | 2009073761 | A1 | 6/2009 | |
| WO | 2013098738 | A1 | 7/2013 | |
| WO | 2017222046 | A1 | 12/2017 | |

OTHER PUBLICATIONS

Notification of the First Office Action issued by the China National Intellectual Property Administration on Mar. 25, 2025, in corresponding Application No. CN 202180041148.8 (5 pages).

* cited by examiner

TYRE FOR VEHICLE WHEELS

This application is a continuation application of U.S. application Ser. No. 18/001,350, filed Dec. 9, 2022, which is a national stage filing under 35 U.S.C. § 371 of International Application No. PCT/IB2021/054680, filed on May 28, 2021, and claims priority to Italian Application No. 102020000014521, filed Jun. 17, 2020; the disclosure of each of these applications are incorporated herein by reference in their entirety.

The present invention relates to a tyre for vehicle wheels.

The tyre of the invention is, preferably, a tyre for wheels of sports automobiles, in particular high and ultra-high-performance automobiles.

Tyres for high and ultra-high-performance automobiles, commonly defined as "HP" or "UHP" tyres, are in particular those that allow speeds of over 190 km/h, up to more than 300 km/h, to be reached. Examples of such tyres are those carrying speed codes "T", "U", "H", "V", "Z", "W", "Y", according to the E.T.R.T.O. (European Tyre and Rim Technical Organization) standard and racing tyres, in particular for high-powered four-wheeled vehicles. Typically, tyres that carry the aforementioned speed codes have a section width equal to or greater than 185 mm, preferably comprised between 195 mm and 385 mm, more preferably comprised between 195 mm and 355 mm. Such tyres are preferably mounted on rims having fitting diameters equal to or greater than 13 inches, preferably not greater than 24 inches, more preferably comprises between 16 inches and 23 inches.

The tyre of the invention can, however, be used in vehicles other than the aforementioned automobiles, for example in high-performance sports motorcycles.

The tyre of the invention comprises hybrid reinforcing cords as defined hereinafter in this description.

The tyre of the invention can also comprise, in addition to the aforementioned hybrid reinforcing cords, hybrid textile reinforcing cords as defined hereinafter in this description.

PRIOR ART

Hybrid reinforcing cords intended to be used in tyres are described, for example, in WO 2013/098738, DE 102004036129, US 2009/0294029, US 2015/0233027, WO 2009/073761, US 2012/0180926, U.S. Pat. Nos. 7,594,380, 8,166,741, EP 621143, U.S. Pat. No. 3,977,174, US 2003/0051788, EP 2000585, WO 2017/222046. Such reinforcing cords comprise a core made of non-metallic material and one or more metallic wires wound around the core.

Hybrid textile reinforcing cords intended to be used in tyres are described, for example, in U.S. Pat. No. 7,222,481 B2, EP 3196343 A1, U.S. Pat. No. 4,343,343 A1, EP 329590 A1, EP 3073002 A1. Such reinforcing cords comprise a core made of textile material and, around the core, a winding of one or more textile filaments made of a material different from that of the core.

SUMMARY OF THE INVENTION

Throughout the present description and in the subsequent claims, when reference is made to certain values of certain angles, they are deemed to be absolute values, i.e. both positive values and negative values with respect to a reference plane or direction, unless specified otherwise.

Furthermore, when reference is made to any range of values comprised between a minimum value and a maximum value, the aforementioned minimum and maximum values are deemed to be included in the aforementioned range, unless expressly specified to the contrary.

Furthermore, all of the ranges include any combination of maximum and minimum values described and include any intermediate range, even if not expressly described specifically.

Even if not expressly indicated, any numerical value is deemed to be preceded by the term "about" to also indicate any numerical value that slightly differs from that described, for example to take into account the dimensional tolerances typical of the field of reference.

The following definitions will apply hereinafter.

The term "equatorial plane" of the tyre is used to indicate a plane perpendicular to the rotation axis of the tyre and that divides the tyre into two symmetrically equal parts.

The terms "radial" and "axial" and the expressions "radially inner/outer" and "axially inner/outer" are used with reference to a direction substantially parallel to the equatorial plane of the tyre and to a direction substantially perpendicular to the equatorial plane of the tyre, respectively, i.e. to a direction substantially perpendicular to the rotation axis of the tyre and to a direction substantially parallel to the rotation axis of the tyre, respectively.

The terms "circumferential" and "circumferentially" are used with reference to the direction of the annular extension of the tyre, i.e. to the rolling direction of the tyre, which corresponds to a direction lying on a plane coinciding with or substantially parallel to the equatorial plane of the tyre.

The term "substantially axial direction" is used to indicate a direction inclined, with respect to the equatorial plane of the tyre, by an angle comprised between 70° and 90°.

The term "substantially circumferential direction" is used to indicate a direction oriented, with respect to the equatorial plane of the tyre, at an angle comprised between 0° and 10°.

The term "elastomeric material" or "elastomer" is used to indicate a material comprising a vulcanizable natural or synthetic polymer and a reinforcing filler, in which such a material, at room temperature and after having been subjected to vulcanization, can have deformations caused by a force and is capable of quickly and energetically recovering the substantially original shape and dimensions after the elimination of the deforming force (according to the definitions of standard ASTM D1566-11 Standard Terminology Relating To Rubber).

The expression "reinforcing cord", or more simply "cord" is used to indicate an elongated element consisting of one or more elongated elements (also identified as "wires" or "yarns") optionally coated with, or embedded in, a matrix of elastomeric material.

Hereinafter, the expression "wire" will be used to refer to single elongated element made of metallic material (in such a case the expression "metallic wire" will also be used), or to a single elongated element consisting of a single textile filament (in such a case the expression "monofilament textile wire" will also be used), whereas the expression "yarn" will be used to refer to an elongated element consisting of the aggregation of a plurality of textile filaments (in such a case the expression "multifilament textile yarn" will also be used).

Each filament can also be called "fiber".

The term "linear density" or "count" of a cord or of a wire/yarn is used to indicate the weight of the cord or of the wire/yarn per unit length. The linear density can be measured in dtex (grams per 10 km of length). For the measurement of the linear density reference is made to flat wires/yarns, without twists applied in the testing step or in the twisting step, according to the tests regulated by BISFA. For example, reference should be made to:

for aramid fibers (AR):

Testing methods for para-aramid fibre yarns, 2002 Edition,

Determination of the linear density—Chapter 6

Determination of the tensile properties—Chapter 7—Test procedure—Paragraph 7.5—with procedure with initial pre tensioning; for lyocell fibers:

Determination of the linear density-Chapter 6

Testing methods for viscose, cupro, acetate, triacetate and lyocell filament yarns—2007 Edition, Determination of tensile properties—Chapter 7—Tensile test conditions: oven dry test—Table 7.1—Test procedure—Paragraph 7.5—With oven dry test on relaxed samples-Subparagraph 7.5.2.4.

The yarns can have one or more "ends", where the term "end" is used to indicate a bundle of filaments twisted together. Preferably, there is a single end or at least two ends twisted together.

The textile reinforcing cords can be identified with a symbol that represents the textile material, the count of the fiber used and the number of ends forming the reinforcing cord. For example, a reinforcing cord with pieces made of Aramid (aromatic polyamide) identified as Ar1672 indicates a cord comprising Aramid fibers with count 1670 dtex, formed of two ends twisted together.

The term "strand" is used to indicate an elongated element obtained by twisting at least two wires or yarns, or at least one wire and at least one yarn, wherein each wire and/or yarn extends along a non-rectilinear direction. Such an elongated element can itself constitute a reinforcing cord or be intended to be twisted with at least another elongated element or strand to form a reinforcing cord. In the case in which the reinforcing cord is obtained by twisting at least two strands, the at least two strands can be equal to each other or different from each other.

The expression "hybrid reinforcing cord" is used to indicate a reinforcing cord comprising at least one metallic wire and at least one multifilament textile yarn.

The expression "hybrid textile reinforcing cord" is used to indicate a reinforcing cord comprising at least one monofilament textile wire and at least one multifilament textile yarn, wherein the at least one monofilament textile wire and the at least one multifilament textile yarn can be made of the same textile material or of different textile materials.

The term "diameter" of a reinforcing cord, or of a wire or yarn, is used to indicate the diameter measured as prescribed by the method BISFA E10 (The International Bureau For The Standardization Of Man-Made Fibres, Internationally Agreed Methods For Testing Steel Tyre Cords, 1995 edition).

In the case of yarns, the term "diameter" of a yarn is used to indicate the diameter of an ideal circumference that circumscribes all of the filaments defining the yarn.

The term "breaking load" of a reinforcing cord is used to indicate the load at which the reinforcing cord breaks, evaluated with the method BISFA E6 (The International Bureau For The Standardization Of Man-Made Fibres, Internationally Agreed Methods For Testing Steel Tyre Cords, 1995 edition).

The term "rigidity" of a reinforcing cord is used to indicate the bending resistant moment with a predetermined angle (usually 15°) evaluated with the method BISFA E8 (The International Bureau For The Standardization Of Man-Made Fibres, Internationally Agreed Methods For Testing Steel Tyre Cords, 1995 edition).

The term "radial carcass structure" is used to indicate a carcass structure comprising a plurality of reinforcing cords, each of which is oriented along a substantially axial direction. Such reinforcing cords can be incorporated in a single carcass layer or in many carcass layers (preferably two) radially juxtaposed over one another.

The term "crossed belt structure" is used to indicate a belt structure comprising a first belt layer including reinforcing cords substantially parallel to one another and inclined with respect to the equatorial plane of the tyre by a predetermined angle and at least one second belt layer arranged in a radially outer position with respect to the first belt layer and including reinforcing cords substantially parallel to one another but oriented, with respect to the equatorial plane of the tyre, with an inclination opposite to the one of the reinforcing cords of the first layer.

The term "zero degrees belt layer" is used to indicate a reinforcing layer comprising at least one reinforcing cord wound on the belt structure according to a substantially circumferential winding direction.

The term "thread count" of a reinforcing layer is used to indicate the number of reinforcing cords per unit of length which are provided in such a layer, like for example a carcass ply or a belt layer. The thread count can be measured in cords/dm (number of cords per decimetre).

Hereinafter, when the adhesion capacity of wires, or yarns, or filaments, or reinforcing cords, or in general of elongated elements, to the elastomeric material is discussed, reference is made to the adhesion capacity provided to the elongated element only by its shape or structure, thus without considering possible surface treatments suitable for this purpose.

Tyres for sports automobiles require a high capability to adhere to the ground, so as to be able to effectively discharge to the ground the high drive torque which they are subjected to and, therefore, achieve a high thrust and an effective braking force. Such tyres must also be light and provide an adequate response to the stresses which they are subjected to during travel in a straight line and cornering.

Tyres for sports automobiles typically comprise a radial carcass structure extending between opposite bead structures, a crossed belt structure arranged in a radially outer position with respect to the carcass structure, a zero degrees reinforcing layer arranged in a radially outer position with respect to the crossed belt structure and a tread band arranged in a radially outer position with respect to the zero degrees reinforcing layer.

The carcass structure is configured to provide the tyre with the desired characteristics of integrity and structural strength, whereas the belt structure, in addition to contribute to the provision of the aforementioned characteristics of integrity and structural strength, is configured to transfer to the carcass structure the lateral and longitudinal stresses which the tyre is subjected to in travel upon contact with the road surface, so as to provide the tyre with the desired performance characteristics (i.e. grip, driving stability, controllability, directionality, roadholding). The zero degrees reinforcing layer, on the other hand, is configured to limit the radial deformation of the belt structure.

In order to achieve the aforementioned structural and performance characteristics, one or more reinforcing layers are provided in the carcass structure and in the belt structure, each comprising a plurality of reinforcing cords properly inclined with respect to the circumferential or rolling direction.

The Applicant has been producing for a long time produced tyres for sports automobiles comprising, in the carcass structure, textile reinforcing cords and, in the belt structure, metallic reinforcing cords.

Considering the general trend to reduce emissions of $CO_2$ into the atmosphere, the Applicant has considered the problem of reducing the rolling resistance of its tyres, including those for sports automobiles.

The Applicant has therefore thought to use in the belt structure reinforcing cords made at least partially from textile material.

The Applicant has observed that by properly selecting the type of textile elements used in the reinforcing cords (monofilament textile wires, multifilament textile yarns and/or possible combination of one or more of the aforementioned wires with one or more of the aforementioned yarns), it is possible to make reinforcing cords having characteristics such as to be theoretically suitable for being used in the belt structure of the tyres.

The Applicant has considered that in tyres for any type of vehicle, including those for sports automobiles, it is necessary to obtain a good adhesion of the reinforcing cords with the surrounding elastomeric material and has found that multifilament textile yarns are most suitable for this purpose with respect to monofilament textile wires due to the fact that, having a smaller diameter or thickness much than that of monofilament textile wires, they offer a larger contact surface with the surrounding elastomeric material.

The Applicant has therefore thought to use in the belt structures of its tyres reinforcing cords comprising multifilament textile yarns.

The Applicant has however observed that, particularly in tyres for sports automobiles, in order to maximize the performance in terms of thrust, braking and response to longitudinal and lateral stresses, it is preferable for the reinforcing cords of the belt structure to have metallic wires. Moreover, according to the Applicant, metallic wires are more suitable than multifilament textile yarns having the same diameter to withstand compression stresses and to reduce the hysteresis caused by the mutual friction between wires and/or textile filaments.

By solving this contradiction and with the goal of fulfilling all of the requirements discussed above, the Applicant has thought to make hybrid reinforcing cords comprising both at least one metallic wire and a multifilament textile yarn.

Being convinced that the adhesion capacity to elastomeric material offered by the filaments of a multifilament textile yarn is greater than that of a metallic wire, the Applicant has considered it appropriate for the at least one metallic wire to be at least partially embedded or incorporated in the filaments of the multifilament textile yarn, so that in any cross section of the reinforcing cord there is at least one sufficiently extended portion of outer surface of the reinforcing cord that is defined by the filaments of the multifilament textile yarn and, therefore, provided with an excellent capacity of adhesion to the surrounding elastomeric material. According to the Applicant, such adhesion is greater the greater the size of the portion of metallic wire that, in any cross section of the hybrid reinforcing cord, is embedded in the multifilament textile yarn.

The Applicant is also convinced that the provision of the at least one metallic wire, in addition to contribute to achieving an adequate capability to respond to the longitudinal, lateral and compression stresses which the tyre being used is subjected to and to reducing hysteresis, makes the reinforcing cord suitable for being processed in current industrial tyre production plants, with consequent benefits in terms of design, construction and production costs. Indeed, in manufacturing lines of the belt structure provided in such plants there are devices or apparatuses specially configured to work with metallic reinforcing cords, like for example cutting devices (typically of the guillotine type) and/or gripping and/or moving and/or positioning and/or centering devices (typically of the magnetic type). Also the forming support on which the layers of the belt structure are deposited is typically of the magnetic type.

The present invention therefore relates, in a first aspect thereof, to a tyre for vehicle wheels, comprising a support structure and a tread band arranged in a radially outer position with respect to the support structure.

Preferably, the support structure comprises at least one reinforcing layer including a plurality of hybrid reinforcing cords.

Preferably, each of said hybrid reinforcing cords comprises at least one first strand including at least one metallic wire twisted together with a first multifilament textile yarn comprising a plurality of filaments.

Preferably, in any cross section of at least some of said hybrid reinforcing cords, said at least one metallic wire is at least partially embedded in the filaments of the first multifilament textile yarn.

In a second aspect thereof, the invention relates to a hybrid reinforcing cord comprising at least one metallic wire and a multifilament textile yarn comprising a plurality of filaments, wherein, preferably, in any cross section of the hybrid reinforcing cord, said at least one metallic wire is at least partially embedded in the filaments of the multifilament textile yarn.

According to the Applicant, a hybrid reinforcing cord as described above allows to maximize the expected results with particular reference to the weight and to the performance of the tyre, at the same time ensuring excellent adhesion of the reinforcing cord to the surrounding elastomeric material, a reduction of the hysteresis and the processability of the reinforcing cord in current industrial tyre production plants.

By suitably selecting the number of strands and of metallic wires provided in the strand it is possible to prioritize weight with respect to the performance of the tyre and vice-versa. In particular, as the number of strands and/or metallic wires increases, the performance of the tyre will improve at the expense of the weight and, vice-versa, as the number of strands and/or metallic wires decreases, the weight will be reduced at the expense of the performance of the tyre.

A suitable selection of the number of strands and/or of metallic wires can also make the hybrid reinforcing cord more suitable for being used in some reinforcing components of the tyre with respect to others.

Indeed, according to the Applicant, the hybrid reinforcing cords described above, whilst being suitable for being used in the belt structure of the tyre, can also be used (also or only) in further reinforcing components of the tyre, like for example in the reinforcing components of the tyre that are described below and are indicated as "flipper" and "chafer", both in place of the conventional metallic reinforcing cords (with consequent advantages in terms of reduction of weight of the tyre, possibility of identification of the tyre through RFID in the case in which the amount of metallic material present in the reinforcing cord is low, and possibility of travel of the deflated tyre without risk of excessive overheating of the reinforcing cords), and in place of the conventional textile reinforcing cords comprising only multifilament textile yarns (with consequent advantages in terms of rigidity, resistance to fatigue and performance).

The aforementioned hybrid reinforcing cords can also be used in the carcass structure of tyres, in which case it is preferable to limit the metallic wires (and/or their diameter) and increase the number of twists per meter of the multifilament textile yarn or reduce the twisting pitch of the metallic wire and of the multifilament textile yarn to have a good flexibility and keep down the weight of the tyre.

The Applicant believes that the hybrid reinforcing cords described above are particularly suitable for being used in tyres of all types of vehicles where high performance is required, thus not only in sports automobiles but also for example in sports motorcycles, still achieving the benefits discussed above.

In at least one of the aforementioned aspects, the present invention can have at least one of the preferred characteristics described below.

Preferably, in any cross section of each of said at least some hybrid reinforcing cords, at least 50% of the outer surface of said at least one metallic wire is embedded in the filaments of the first multifilament textile yarn. In this way, the possible portion of outer surface of the metallic wire that, in each cross section of the reinforcing cord, would be directly exposed towards the surrounding elastomeric material would have an extension such as not to compromise the excellent adhesion of the reinforcing cord with the surrounding elastomeric material.

Preferably, said at least some hybrid reinforcing cords comprise at least one portion (or segment) of cord at which said at least one metallic wire is completely surrounded by the filaments of the first multifilament textile yarn, with consequent advantages in terms of adhesion to the surrounding elastomeric material.

Each of said at least some hybrid reinforcing cords can comprise a single first strand (in which case the hybrid reinforcing cord is defined by, or coincides with, such a single first strand), or more than one first strand (in which case the hybrid reinforcing cord is defined by the whole of such strands).

In some embodiments, said at least some hybrid reinforcing cords comprise at least two first strands twisted to one another. Such a provision makes it possible to increase the resistance to fatigue of the hybrid reinforcing cord.

The twisting direction of the at least one metallic wire and of the first multifilament textile yarn may or may not be the same as the twisting direction of the at least two first strands. Preferably, the aforementioned twisting directions are the same.

Preferably, each of said at least two first strands comprises at least one respective metallic wire and a respective first multifilament textile yarn arranged so that, in any cross section of said at least some hybrid reinforcing cords, said at least one respective metallic wire is preferably at least partially embedded in the filaments of the respective first multifilament textile yarn.

Preferably, said at least some hybrid reinforcing cords comprise n first strands twisted together, wherein n is a number comprised between 1 and 4, more preferably between 1 and 3.

Preferably, each of said n first strands comprises x metallic wires, wherein x is a number comprised between 1 and 3, preferably equal to 1 or 2, even more preferably equal to 1.

Preferably, the at least one metallic wire is twisted to the first multifilament textile yarn with a first twisting pitch that is greater than about 1 mm, more preferably greater than about 2 mm.

Preferably, the aforementioned first twisting pitch is lower than about 20 mm, more preferably lower than about 15 mm.

In preferred embodiments, the aforementioned first twisting pitch is comprised between about 1 mm and about 20 mm, more preferably between about 2 mm and about 15 mm, for example equal to 12.5 mm.

Preferably, in the case in which more than one first strand is provided, the twisting pitch of the first strands is equal to the aforementioned first twisting pitch.

Preferably, said at least one metallic wire has a diameter greater than 0.10 mm, more preferably greater than 0.15 mm.

Preferably, said at least one metallic wire has a diameter lower than 0.45 mm, more preferably lower than 0.40 mm.

In preferred embodiments, said at least one metallic wire has a diameter comprised between 0.10 mm and 0.45 mm, more preferably between 0.15 mm and 0.40 mm, for example equal to 0.22 mm.

Preferably, the choice of the diameter of the metallic wires is made as a function of the number of metallic wires provided in the hybrid reinforcing cord. In particular, the more metallic wires are provided in each hybrid reinforcing cord the more the diameter of said metallic wires can be reduced.

Preferably, the first multifilament textile yarn has a linear density greater than 400 dtex, more preferably greater than 800 dtex.

Preferably, the first multifilament textile yarn has a linear density lower than 4000 dtex, more preferably lower than 2500 dtex.

In preferred embodiments, the first multifilament textile yarn has a linear density comprised between 400 dtex and 4000 dtex, more preferably between 800 dtex and 2500 dtex, for example equal to 1680 dtex.

Preferably, the linear density of the first multifilament textile yarn is greater the smaller the number of metallic wires embedded in the first multifilament textile yarn and/or the smaller the diameter of such metallic wires.

Preferably, said at least one metallic wire is made of steel.

Preferably, the filaments of the first multifilament textile yarn are made of fibers selected from the group comprising fibers of aromatic polyamides, fibers of aliphatic polyamides (for example Nylon 6, Nylon 6.6, Nylon 4.6, Nylon 4.10, Nylon 10.10, Nylon 11, Nylon 12, Nylon 6.10, Nylon 6.12), polyester fibers (for example polybutylene terephthalate, polyethylene terephthalate, polyethylene isophthalate), polyketone fibers, polyvinyl alcohol fibers, cellulose fibers (for example rayon, lyocell), glass fibers, carbon fibers or mixtures thereof, or assemblies of mixed fibers comprising two or more of the materials listed above. Such assemblies of mixed fibers are indicated hereinafter with the term "commingled fibers".

In the case of commingled fibers, the fibers of the filaments of the first multifilament textile yarn can for example comprise:

50% Aramid with linear density equal to 1100 dtex and 50% PET with linear density equal to 1100 dtex;

43% Aramid with linear density equal to 840 dtex and 57% PET with linear density equal to 1100 dtex;

33% Aramid with linear density equal to 550 dtex and 67% PET with linear density equal to 1100 dtex.

In some preferred embodiments, the reinforcing cord comprises only one or more first strands.

In other preferred embodiments, said at least one first strand is twisted together with at least one second strand made of textile material. In this case the hybrid reinforcing cord thus comprises at least two strands of different type, at least one of which being made of textile material.

Preferably, the second strand includes at least one monofilament textile wire twisted together with a second multifilament textile yarn comprising a plurality of filaments.

Preferably, in any cross section of said at least some hybrid reinforcing cords, said at least one monofilament textile wire is at least partially embedded in the filaments of the second multifilament textile yarn.

Preferably, in any cross section of said at least some hybrid reinforcing cords, at least 50% of the outer surface of said at least one monofilament textile wire is embedded in the filaments of the second multifilament textile yarn. In this way, the possible portion of outer surface of the monofilament textile wire that, in each cross section of the hybrid reinforcing cord, would be directly exposed towards the surrounding elastomeric material would have an extension such as not to compromise the excellent adhesion of the hybrid reinforcing cord with the surrounding elastomeric material.

Preferably, said at least some hybrid reinforcing cords comprise at least one portion (or segment) of cord at which said at least one monofilament textile wire is completely surrounded by the filaments of the second multifilament textile yarn, with consequent advantages in terms of adhesion to the surrounding elastomeric material.

Each of said at least some hybrid reinforcing cords can comprise a single second strand or many second strands.

In some embodiments, said at least some hybrid reinforcing cords comprise at least two second strands twisted together with said at least one first strand.

It is possible to foresee embodiments of hybrid reinforcing cords comprising at least two second strands twisted together with a single first strand and different embodiments of hybrid reinforcing cords comprising at least two first strands twisted together with a single second strand.

Preferably, each of said at least two second strands comprises at least one respective monofilament textile wire and a respective second multifilament textile yarn arranged so that, in any cross section of said at least some hybrid reinforcing cords, said at least one respective monofilament textile wire is preferably at least partially embedded in the filaments of the respective second multifilament textile yarn.

Preferably, said at least some hybrid reinforcing cords comprise m second strands twisted together with said at least one first strand, wherein m is a number comprised between 1 and 4, more preferably between 1 and 3.

Preferably, each of said m second strands comprises y first monofilament textile wires, wherein y is a number comprised between 1 and 3, more preferably equal to 1 or 2, even more preferably equal to 1.

Preferably, the monofilament textile wire is twisted to the second multifilament textile yarn with a second twisting pitch that is greater than about 1 mm, more preferably greater than about 2 mm.

Preferably, the aforementioned second twisting pitch is lower than about 20 mm, more preferably lower than about 15 mm.

In preferred embodiments, the aforementioned second twisting pitch is comprised between about 1 mm and about 20 mm, more preferably between about 2 mm and about 15 mm.

Preferably, the aforementioned second twisting pitch is equal to the aforementioned first twisting pitch.

Preferably, in the case in which more than one second strand is provided, the twisting pitch of the second strands with the at least one first strand may or may not be equal to the aforementioned second twisting pitch.

The twisting direction of the monofilament textile wire and of the second multifilament textile yarn may or may not be the same as the twisting direction of the at least one second strand with the at least one first strand. Preferably, the aforementioned twisting directions are the same.

Preferably, said at least one monofilament textile wire has a diameter greater than about 0.10 mm, more preferably greater than about 0.15 mm.

Preferably, said at least one monofilament textile wire has a diameter lower than about 0.70 mm, more preferably lower than about 0.50 mm.

In preferred embodiments, said at least one monofilament textile wire has a diameter comprised between about 0.10 mm and about 0.70 mm, more preferably between about 0.15 mm and about 0.50 mm, for example equal to 0.40 mm.

In general, preferably, the more monofilament textile wires are contained in each second strand of the hybrid reinforcing cord the more the diameter of said monofilament textile wires can be reduced.

Preferably, the second multifilament textile yarn has a linear density greater than about 400 dtex, more preferably greater than about 800 dtex.

Preferably, the second multifilament textile yarn has a linear density lower than about 4000 dtex, more preferably lower than about 2500 dtex.

In preferred embodiments, the second multifilament textile yarn has a linear density comprised between about 400 dtex and about 4000 dtex, more preferably between about 800 dtex and about 2500 dtex, for example equal to 1680 dtex.

Preferably, the linear density of the second multifilament textile yarn is greater the smaller the number of monofilament textile wires embedded in the second multifilament textile yarn and/or the smaller the diameter of such monofilament textile wires.

Preferably, said at least one monofilament textile wire is made of aliphatic polyamide fibers (for example Nylon 6, Nylon 6.6, Nylon 4.6, Nylon 4.10, Nylon 10.10, Nylon 11, Nylon 12, Nylon 6.10, Nylon 6.12), polyester fibers (for example polybutylene terephthalate, polyethylene terephthalate, polyethylene isophthalate), polyaryletherketone fibers (for example polyetheretherketone), or mixtures thereof.

Preferably, the filaments of the second multifilament textile yarn are made of fibers of aromatic polyamides, fibers of aliphatic polyamides (for example Nylon 6, Nylon 6.6, Nylon 4.6, Nylon 4.10, Nylon 10.10, Nylon 11, Nylon 12, Nylon 6.10, Nylon 6.12), polyester fibers (for example polybutylene terephthalate, polyethylene terephthalate, polyethylene isophthalate), polyketone fibers, polyvinyl alcohol fibers, cellulose fibers (for example rayon, lyocell), glass fibers, carbon fibers or mixtures thereof, or assemblies of mixed fibers comprising two or more of the materials listed above. In the case of commingled fibers, the fibers of the filaments of the second multifilament textile yarn can for example comprise:

50% Aramid with linear density equal to 1100 dtex and 50% PET with linear density equal to 1100 dtex;

43% Aramid with linear density equal to 840 dtex and 57% PET with linear density equal to 1100 dtex;

33% Aramid with linear density equal to 550 dtex and 67% PET with linear density equal to 1100 dtex.

Preferably, the second multifilament textile yarn is the same as the first multifilament textile yarn.

The at least one first monofilament textile wire may or may not be twisted on itself before being twisted to the second multifilament textile yarn.

Preferably, said at least one monofilament textile wire is twisted on itself with a predetermined first twist pitch. The Applicant has observed that such a provision contributes to optimizing the behavior under fatigue of the hybrid reinforcing cord.

Preferably, said first twist pitch is equal to the second twisting pitch. In this way, the embedding of the monofilament textile wires in the filaments of the respective multifilament textile yarns is maximized, to the benefit of the adhesion of the hybrid reinforcing cord with the surrounding elastomeric material.

The second multifilament textile yarn may or may not be twisted on itself with a predetermined second twist pitch before being twisted to said at least one monofilament textile wire. When twisted on itself, preferably, the second twist pitch is equal to said second twisting pitch. This provision allows to maximize the embedding of the monofilament textile wires in the filaments of the respective multifilament textile yarns.

Preferably, said plurality of hybrid reinforcing cords belongs to a fabric having a plurality of elongated weft elements and a plurality of elongated warp elements. The provision of the aforementioned hybrid reinforcing cords in fabric form allows, once the fabric has been acquired, an immediate use of the fabric in the reinforcing layer of the tyre without the need to carry out twisting operations of the wires/yarns by the user, which are in fact necessary in the case in which single reinforcing cords had to be used.

More preferably, said at least some hybrid reinforcing cords belong to said plurality of elongated warp elements.

In some preferred embodiments, said at least one reinforcing layer also comprises a plurality of textile reinforcing cords.

Preferably, said textile reinforcing cords are hybrid textile reinforcing cords as defined above.

More preferably, at least some of said hybrid textile reinforcing cords comprises at least one strand comprising at least one monofilament textile wire twisted together to a respective multifilament textile yarn.

Preferably, the at least one strand of the hybrid textile reinforcing cord is the same as said at least one second strand of the hybrid reinforcing cord and thus has all of the advantageous aspects discussed above with reference to the second strand of the hybrid reinforcing cord.

Therefore, also in this case, preferably, in any cross section of said at least some hybrid textile reinforcing cords, said at least one monofilament textile wire is at least partially embedded in the filaments of the respective multifilament textile yarn, so as to ensure a high adhesion of the reinforcing cord to the surrounding elastomeric material. Furthermore, thanks to the aforementioned embedding, the reinforcing cord has substantially isostatic behaviour when subjected to a compression stress, i.e. all of the components of the reinforcing cord (monofilament textile wire and filaments of the multifilament textile yarn) are stressed substantially in the same way.

Preferably, in any cross section of each of said at least some hybrid textile reinforcing cords, at least 50% of the outer surface of said at least one monofilament textile wire is embedded in the filaments of the respective multifilament textile yarn. In this way, the possible portion of outer surface of the monofilament textile wire that, in each cross section of the hybrid textile reinforcing cord, would be directly exposed towards the surrounding elastomeric material would have an extension such as not to compromise the excellent adhesion of the hybrid textile reinforcing cord with the surrounding elastomeric material.

With the goal of maximizing such adhesion, more preferably, said at least some hybrid textile reinforcing cords comprise at least one portion (or segment) of cord at which said at least one monofilament textile wire is completely surrounded by the filaments of the respective multifilament textile yarn.

Each of said at least some hybrid textile reinforcing cords can comprise a single strand or many strands.

In some embodiments, said at least some hybrid textile reinforcing cords comprise at least two strands twisted together.

Preferably, each of said at least two second strands comprises at least one respective monofilament textile wire and a respective multifilament textile yarn arranged so that, in any cross section of said at least some hybrid textile reinforcing cords, said at least one respective monofilament textile wire is preferably at least partially embedded in the filaments of the respective multifilament textile yarn.

The twisting direction of the monofilament textile wire and of the multifilament textile yarn of each strand of the hybrid textile reinforcing cord may or may not be equal to the twisting direction of the at least two strands of such a reinforcing cord. Preferably, the aforementioned twisting directions are the same.

Preferably, said at least some hybrid textile reinforcing cords comprise p strands twisted together, wherein p is a number comprised between 1 and 4, more preferably between 1 and 3.

Preferably, each of said p second strands comprises q monofilament textile wires, wherein q is a number comprised between 1 and 3, more preferably equal to 1 and 2, even more preferably equal to 1.

Preferably, the at least one strand provided in the hybrid textile reinforcing cords described above has the same preferred characteristics described above with reference to the at least one second strand provided in the hybrid reinforcing cords described above. The aforementioned identical preferred characteristics are, particular, the twisting pitch of the monofilament textile wire and of the multifilament textile yarn, the twisting pitch of the strands (in the case in which the hybrid textile reinforcing cord has more than one strand), the diameter of the monofilament textile wire, the linear density of the multifilament textile yarn, the materials from which the monofilament textile wire and the filaments of the multifilament textile yarn are made and the possible twist pitch of the monofilament textile wire and of the multifilament textile yarn.

Preferably, said at least some hybrid textile reinforcing cords belong to said fabric.

More preferably, said at least some textile reinforcing cords belong to the plurality of elongated warp elements of such a fabric.

Preferably, said fabric comprises at least one of said hybrid reinforcing cords every z hybrid textile reinforcing cords, wherein z is a number comprised between 1 and 30.

The choice of the value of the number z depends on the particular intended use. For example, when it is wished to prioritize the weight of the tyre with respect to the performance, a large value of z will be chosen (preferably greater than 10, for example equal to 30), whereas when it is wished to prioritize the performance of the tyre with respect to the weight, a lower value of z will be chosen (preferably lower than 10).

The choice of the value of the number z can also be made as a function of the diameter and/or the number of metallic wires provided in each hybrid reinforcing cord or in each first strand of the hybrid reinforcing cord. For example, the greater the aforementioned diameter and/or number, the greater the value of the number z.

Preferably, said at least one reinforcing layer has a thread count greater than 50 cords/dm, more preferably greater than 60 cords/dm.

Preferably, said at least one reinforcing layer has a thread count lower than, or equal to, 100 cords/dm, more preferably lower than, or equal to, 85 cords/dm.

In preferred embodiments, said at least one reinforcing layer has a thread count comprised between 50 cords/dm and 100 cords/dm, preferably between 60 cords/dm and 85 cords/dm.

The Applicant has observed that the provision of the aforementioned thread count values contributes to optimally satisfying the requirement of increasing as much as possible the number of cords present in the reinforcing layer compatibly with the need to still provide a distance between adjacent reinforcing cords such as to ensure the presence of an amount of elastomeric material sufficient to ensure the desired mechanical behaviour of the reinforcing layer. The Applicant believes that such a distance must preferably have an extension not lower than 0.10 mm, more preferably not lower than 0.15 mm, for example equal to 0.20 mm.

Preferably, said at least one reinforcing layer has a thickness greater than 0.7 mm, more preferably greater than 0.9 mm.

Preferably, said at least one reinforcing layer has a thickness lower than 1.6 mm, more preferably lower than 1.3 mm.

In preferred embodiments, said at least one reinforcing layer has a thickness comprised between 0.7 mm and 1.6 mm, preferably between 0.9 mm and 1.3 mm.

The Applicant has observed that the provision of the aforementioned thickness values contributes to optimally satisfying the requirement of providing, in radially outer and inner positions with respect to the hybrid reinforcing cords provided in the reinforcing layer, a layer of elastomeric material sufficient to ensure the desired mechanical behaviour and the desired geometry of the reinforcing layer. The Applicant believes that such a reinforcing layer must preferably have a thickness not lower than 0.10 mm, more preferably not lower than 0.15 mm, for example equal to 0.20 mm.

Preferably, said support structure comprises a carcass structure comprising at least one carcass layer having opposite end edges turned around respective annular anchoring structures to define, on opposite sides with respect to an equatorial plane of the tyre, respective bead structures.

Preferably, said support structure comprises a crossed belt structure arranged in a radially outer position with respect to the carcass structure and in a radially inner position with respect to the tread band.

Preferably, said crossed belt structure comprises at least two belt layers arranged radially juxtaposed with respect to one another.

Preferably, said support structure comprises at least one stiffening layer associated with said at least one carcass layer at or close to a respective turned end edge.

Preferably, said at least one reinforcing layer belongs to at least one belt layer of the crossed belt structure and/or to the aforementioned stiffening layer. However, it is provided for said at least one reinforcing layer to be able to belong to said at least one carcass layer.

Preferably, said at least one stiffening layer can be associated with said at least one carcass layer at or close to a respective bead structure.

Preferably, said at least one stiffening layer can be interposed between a respective turned end edge of said at least one carcass layer and a respective bead structure.

More preferably, said at least one stiffening layer can at least partially surround said bead structure. Such a stiffening layer is also indicated with the term “flipper”.

Alternatively or in addition, said at least one stiffening layer can be associated with the respective turned end edge of said at least one carcass layer in an axially outer position with respect to the respective annular anchoring structure.

More preferably, said at least one stiffening layer can extend from said annular anchoring structure towards said tread band. Such a stiffening layer is also indicated with the term “chafer”.

The chafer can be arranged in an axially outer position or in an axially inner position with respect to the end edge of said at least one carcass layer. In the case in which the carcass structure comprises many carcass layers, for example two, the chafer can be interposed between the respective end edges of the various carcass layers.

Preferably, in all of the embodiments and in all of the applications discussed above, the zero degrees reinforcing layer comprises non-hybrid reinforcing cords, thus different from the hybrid reinforcing cords and from the hybrid textile reinforcing cords described above.

Preferably, such non-hybrid reinforcing cords comprise only monofilament textile wires or multifilament textile yarns, for example made of aramid or nylon.

However, embodiments are foreseen in which the zero degrees belt layer comprises hybrid reinforcing cords and/or hybrid textile reinforcing cords of the type described above.

In some embodiments, at least some of said hybrid textile reinforcing cords comprise at least one metallic wire wound helically around said at least two second strands twisted together.

The aforementioned metallic wire advantageously contributes to strengthen the hybrid textile reinforcing cord and to keep said at least two second strands firmly twisted to one another, without also impeding the actuation of an identification process through RFID.

The winding direction of the aforementioned metallic wire on said at least two second strands twisted together may or may not be consistent with the twisting direction of said at least two second strands.

Preferably, the aforementioned winding direction is opposite to the twisting direction of said at least two second strands.

Preferably, the metallic wire is wound on said at least two second strands twisted together with a winding pitch greater than 2 mm, more preferably greater than 3.5 mm.

Preferably, the metallic wire is wound on said at least two second strands twisted together with a winding pitch lower than 10 mm, more preferably lower than 5 mm.

In preferred embodiments, the metallic wire is wound on said at least two second strands twisted together with a winding pitch comprised between 2 mm and 10 mm, preferably between 3.5 mm and 5 mm.

Preferably, said metallic wire has a diameter greater than 0.08 mm, more preferably greater than 0.10 mm.

Preferably, said metallic wire has a diameter lower than 0.20 mm, more preferably lower than 0.15 mm.

Preferably, said metallic wire has a diameter comprised between 0.08 mm and 0.20 mm, more preferably between 0.10 mm and 0.15 mm.

Preferably, the hybrid textile reinforcing cords comprising the aforementioned metallic wire are used in the crossed belt structures and/or in the aforementioned stiffening layers.

Preferably, the filaments of the multifilament textile yarns of the hybrid reinforcing cords and of the hybrid textile reinforcing cords described above are coated with an adhesive substance, or subjected to a chemical or physical adhesiveness treatment, in order to further improve the adhesion with the elastomeric material in which they are embedded or with which they are coated.

DESCRIPTION OF EMBODIMENTS OF THE INVENTION

Further characteristics and advantages of the tyre of the present invention will become clearer from the following detailed description of preferred embodiments thereof, made with reference to the attached drawings. In such drawings.

Figure 1:
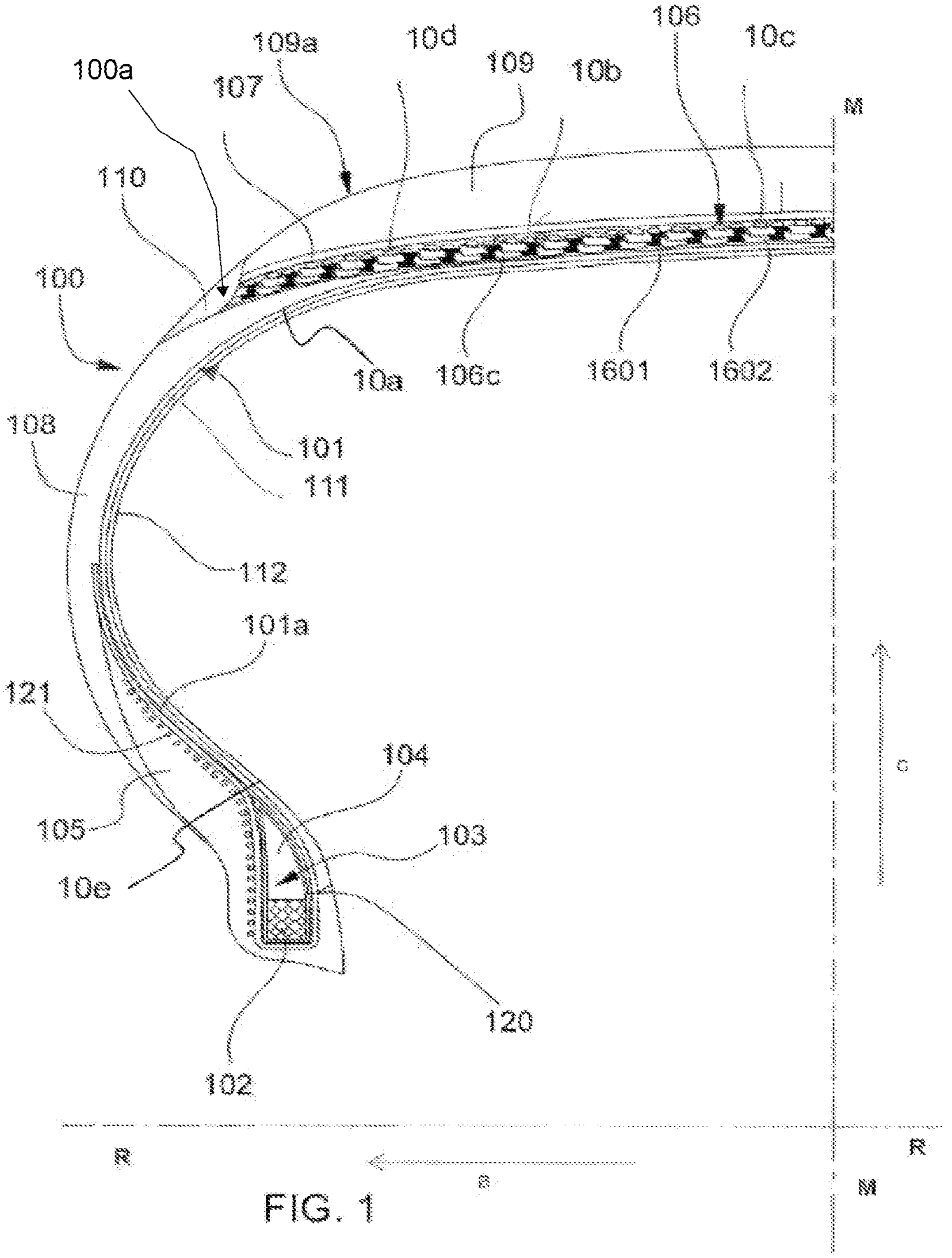
FIG. 1 is a schematic partial half-cross-sectional view of a portion of a tyre according to an embodiment of the present invention.

For the sake of simplicity, FIG. 1 shows only a part of an exemplary embodiment of a tyre 100 in accordance with the present invention, the remaining part, which is not shown, being substantially identical and being arranged symmetrically with respect to the equatorial plane M-M of the tyre.

The tyre 100 shown in FIG. 1 is, in particular, an exemplary embodiment of a tyre for four-wheeled vehicles.

Preferably, the tyre 100 is an HP or UHP tyre for sports and/or high or ultra-high-performance vehicles.

In particular, the tyre 100 carries one of the following speed codes: “T”, “U”, “H”, “V”, “Z”, “W”, “Y”, according to the E.T.R.T.O. standard.

In FIG. 1 “a” indicates an axial direction, “c” indicates a radial direction, “M-M” indicates the equatorial plane of the tyre 100 and “R-R” indicates the rotation axis of the tyre 100.

The tyre 100 comprises at least one support structure **100*a* and, in a radially outer position with respect to the support structure 100*a*, a tread band 109** made of elastomeric material.

The support structure **100*a* comprises a carcass structure 101, which in turn comprises at least one carcass layer 111**.

Hereinafter, for the sake of simplicity of presentation, reference will be made to an embodiment of the tyre 100 comprising a single carcass layer 111. However, it is understood that what is described has an analogous application in tyres comprising more than one carcass layer.

The carcass layer 111 has axially opposite end edges engaged with respective annular anchoring structures 102, called bead cores, possibly associated with an elastomeric filler 104. The area of the tyre 100 comprising the bead core 102 and the possible elastomeric filler 104 forms an annular reinforcing structure 103 which is called “bead structure” and which is intended to allow the tyre 100 to be anchored on a corresponding mounting rim, not shown.

The carcass layer 111 comprises a plurality of reinforcing cords **10*a*** coated with elastomeric material or embedded in a matrix of cross-linked elastomeric material.

The carcass structure 101 is of the radial type, i.e. the reinforcing cords **10*a* are arranged on planes comprising the rotation axis R-R of the tyre 100 and substantially perpendicular to the equatorial plane M-M of the tyre 100**.

Each annular reinforcing structure 103 is associated with the carcass structure 101 by folding back (or turning) the opposite end edges of the at least one carcass layer 111 about the bead core 102 and the possible elastomeric filler 104, so as to form the so-called turns 101a of the carcass structure 101.

In an embodiment, the coupling between carcass structure 101 and annular reinforcing structure 103 can be made through a second carcass layer (not shown in FIG. 1) which is applied in a radially outer position with respect to the carcass layer 111.

An anti-abrasion strip 105 is arranged at each annular reinforcing structure 103 so as to wrap around the annular reinforcing structure 103 along the axially inner, axially outer and radially inner areas of the annular reinforcing structure 103, thus being placed between the latter and the rim of the wheel when the tyre 100 is mounted on the rim. However, such an anti-abrasion strip 105 may not be provided.

The support structure **100*a* comprises, in a radially outer position with respect to the carcass structure 101, a crossed belt structure 106 comprising at least two belt layers 1061, 1062** arranged radially juxtaposed with respect to one another.

The belt layers 1061, 1062 respectively comprise a plurality of reinforcing cords **10*b*, 10*c*. Such reinforcing cords 10*b*, 10*c* have an orientation inclined with respect to the circumferential direction of the tyre 100, or to the equatorial plane M-M of the tyre 100**, by an angle comprised between 15° and 45°, preferably between 20° and 40°. For example, such an angle is equal to 30°.

The support structure 100*a* can also comprise a further belt layer (not shown) arranged between the carcass structure 101 and the radially innermost belt layer of the aforementioned belt layers 1061, 1062 and comprising a plurality of reinforcing cords having an orientation inclined with respect to the circumferential direction of the tyre 100, or to the equatorial plane M-M of the tyre 100, by an angle equal to 90°.

The support structure 100*a* can also comprise a further belt layer (not shown) arranged in a radially outer position with respect to the radially outermost belt layer of the aforementioned belt layers 1061, 1062 and comprising a plurality of reinforcing cords having an orientation inclined with respect to the circumferential direction of the tyre 100, or to the equatorial plane M-M of the tyre 100, by an angle comprised between 20° and 70°.

The reinforcing cords 10*b*, 10*c* of a belt layer 1061, 1062 are parallel to one another and have a crossed orientation with respect to the reinforcing cords 10*c*, 10*b* of the other belt layer 1062, 1061.

In ultra-high-performance tyres, the belt structure 106 can be a turned crossed belt structure. Such a belt structure is made by arranging at least one belt layer on a support element and turning the opposite lateral end edges of said at least one belt layer. Preferably, at first a first belt layer is deposited on the support element, then the support element is radially expanded, then a second belt layer is deposited on the first belt layer and finally the opposite axial end edges of the first belt layer are turned onto the second belt layer to at least partially cover the second belt layer, which is the radially outermost one. In some cases, it is possible to arrange a third belt layer on the second belt layer. Advantageously, the turning of the axially opposite end edges of a belt layer on another belt layer arranged in a radially outer position of the first one provides the tyre with a greater reactivity and responsiveness when tackling a bend.

The support structure 100*a* comprises, in a radially outer position with respect to the crossed belt structure 106, at least one zero degrees reinforcing layer 106*c*, commonly known as "zero degrees belt". t comprises reinforcing cords 10*d* oriented in a substantially circumferential direction. Such reinforcing cords 10*d* thus form an angle of a few degrees (typically lower than 10°, for example comprised between 0° and 6°) with respect to the equatorial plane M-M of the tyre 100.

The reinforcing cords 10*a*, 10*b*, 10*c*, 10*d* are coated with an elastomeric material or embedded in a matrix of cross-linked elastomeric material.

The tread band 109 made of elastomeric material, as well as other semi-finished products constituting the tyre 100, is applied in a radially outer position with respect to the zero degrees reinforcing layer 106*c*.

Respective sidewalls 108 made of elastomeric material are also applied on the lateral surfaces of the carcass structure 101, in an axially outer position with respect to the carcass structure 101 itself. Each sidewall 108 extends from one of the lateral edges of the tread band 109 up to the respective annular reinforcing structure 103.

The anti-abrasion strip 105, if provided, extends at least up to the respective sidewall 108.

In some specific embodiments, like the one shown and described here, the rigidity of the sidewall 108 can be improved by providing a stiffening layer 120, generally known as "flipper" or additional strip-like insert, which has the function of increasing the rigidity and integrity of the annular reinforcing structure 103 and of the sidewall 108.

The flipper 120 is wound around a respective bead core 102 and the elastomeric filler 104 so as to at least partially surround the annular reinforcing structure 103. In particular, the flipper 120 wraps around the annular reinforcing structure 103 along the axially inner, axially outer and radially inner areas of the annular reinforcing structure 103.

The flipper 120 is arranged between the turned end edge of the carcass layer 111 and the respective annular reinforcing structure 103. Usually, the flipper 120 is in contact with the carcass layer 111 and the annular reinforcing structure 103.

In some specific embodiments, like the one shown and described here, the bead structure 103 can also comprise a further stiffening layer 121 that is generally known by the name "chafer", or protective strip, and which has the function of increasing the rigidity and integrity of the annular reinforcing structure 103.

The chafer 121 is associated with a respective turned end edge of the carcass layer 111 in an axially outer position with respect to the respective annular reinforcing structure 103 and extends radially towards the sidewall 108 and the tread band 109.

The flipper 120 and the chafer 121 comprise reinforcing cords 10*e* (in the attached figures those of the flipper 120 are not visible) coated with an elastomeric material or embedded in a matrix of cross-linked elastomeric material.

The tread band 109 has, in a radially outer position thereof, a rolling surface 109*a* intended to come into contact with the ground. Circumferential grooves (not shown in FIG. 1) are formed on the rolling surface 109*a*, such grooves being connected by transversal notches (not shown in FIG. 1) so as to define on the rolling surface 109*a* a plurality of blocks of various shapes and sizes (not shown in FIG. 1).

A sub-layer 107 is arranged between the crossed belt structure 106 and the tread band 109.

In some specific embodiments, like the one shown and described herein, a strip 110 consisting of elastomeric material, commonly known as "mini-sidewall", can possibly be provided in the connection area between the sidewalls 108 and the tread band 109. The mini-sidewall 110 is generally obtained through co-extrusion with the tread band 109 and it allows an improvement of the mechanical interaction between the tread band 109 and the sidewalls 108.

Preferably, an end portion of the sidewall 108 directly covers the lateral edge of the tread band 109.

In the case of tubeless tyres, a layer of rubber 112, generally known as "liner", can also be provided in a radially inner position with respect to the carcass layer 111 to supply the necessary air tightness to the inflation air of the tyre 100.

At least some of the reinforcing cords 10*a* (preferably all of the reinforcing cords 10*a* provided in the carcass layer 111) and/or of the reinforcing cords 10*b*, 10*c* (preferably all of the reinforcing cords 10*b* provided in the belt layer 1061 and all of the reinforcing cords 10*c* provided in the belt layer 1062, also in the case in which the crossed belt structure 106 is a turned crossed belt structure) and/or of the reinforcing cords 10*e* of the flipper 120 and/or of the chafer 121 are hybrid reinforcing cords 10' of the type shown in FIGS. 2-6 and described below.

The reinforcing cords 10*d* are, on the other hand, preferably, non-hybrid reinforcing cords, i.e. made of a single textile material, preferably aramid or nylon.

Figure 2:
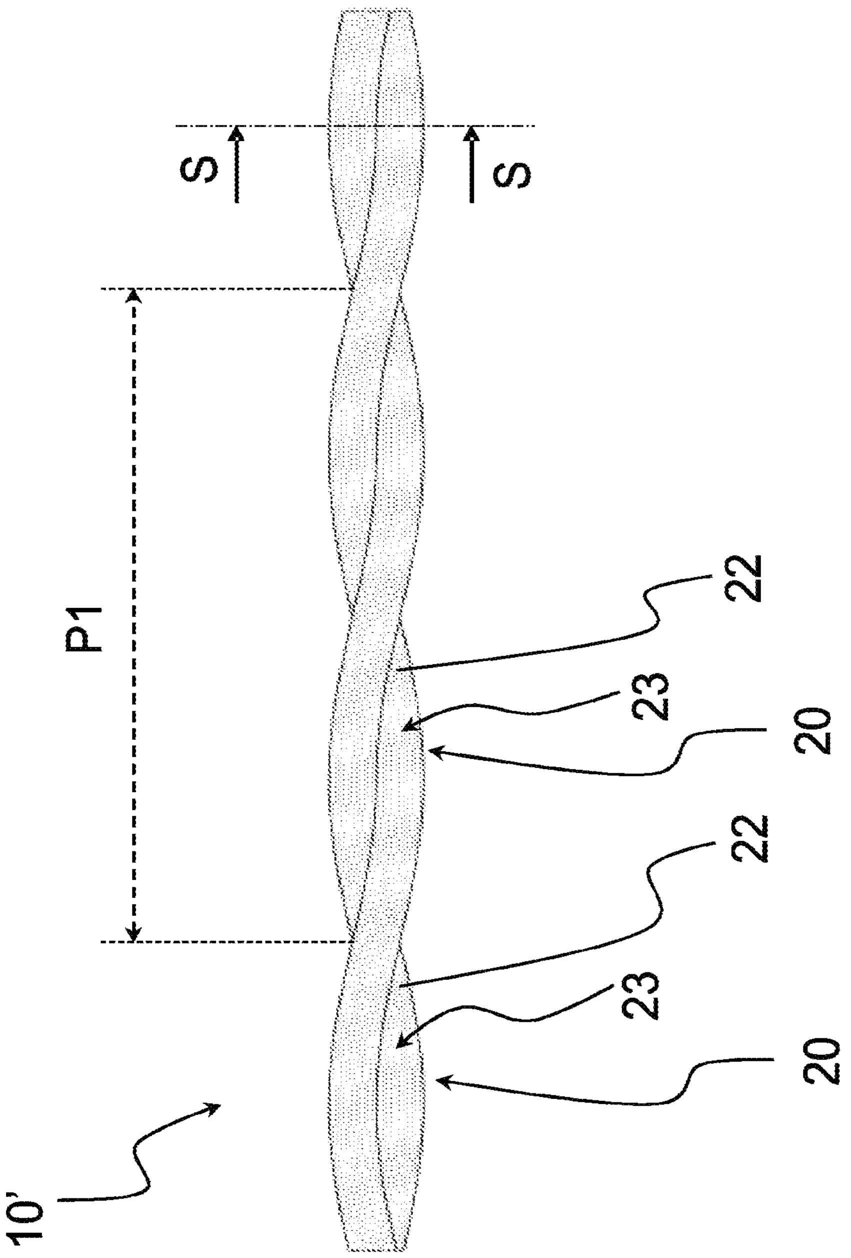
FIG. 2 is a schematic side view of a segment of an embodiment of a hybrid reinforcing cord used in the tyre of FIG. 1.
Figure 3:
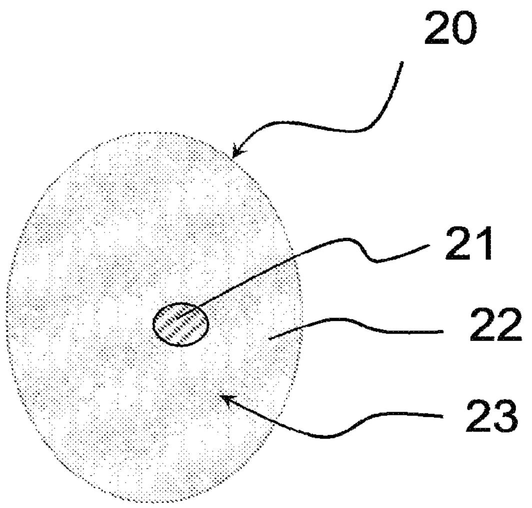
FIG. 3 is an enlarged schematic view of a cross-section of a first strand belonging to the hybrid reinforcing cord of FIG. 2.
Figure 4:
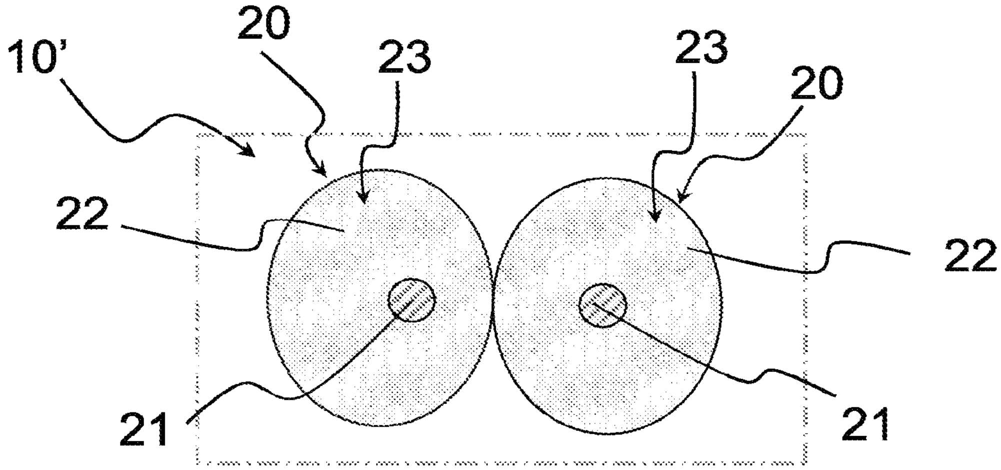
FIG. 4 is an enlarged schematic view of a cross-section of a first embodiment of the hybrid reinforcing cord of FIG. 2 comprising two first strands like those of FIG. 3, such a cross section being taken on the section plane S-S drawn in FIG. 2.

With reference to FIGS. 2-4, the hybrid reinforcing cord 10' comprises two strands 20 twisted to one another.

Preferably, the two strands 20 are identical. Therefore, only one of them, shown in FIG. 3, will be described hereinafter.

The strand 20 comprises a single metallic wire 21 twisted together with a multifilament textile yarn 22 defined by a plurality of filaments 23.

The twisting pitch of the metallic wire 21 and of the multifilament textile yarn 22 is preferably the same as the twisting pitch P1 of the two strands 20. Such a twisting pitch P1 is preferably comprised between 1 mm and 20 mm, more preferably between 2 mm and 15 mm, for example equal to 12.5 mm.

As can be seen in the cross sections shown in FIGS. 3 and 4, in at least some of the cross sections of the strand 20 and of the hybrid reinforcing cord 10' the metallic wire 21 is completely embedded in the filaments 23 of the multifilament textile yarn 22.

The strand 20 can comprise more than one metallic wire 21 embedded in the filaments 23 of the multifilament textile yarn 22.

In particular, it is possible to provide up to three metallic wires 21 for each strand 20, preferably up to two metallic wires 21, even more preferably a single metallic wire 21 for each strand 20.

In the embodiment shown in FIGS. 2-4, the metallic wire 21 is, in at least some of the cross sections of the strand 20 and of the hybrid reinforcing cord 10', completely embedded in the filaments 23 of the multifilament textile yarn 22 and, therefore, the aforementioned filaments 23 are arranged around the metallic wire 21 so as to completely surround the metallic wire 21.

Therefore, the hybrid reinforcing cord 10' of FIG. 2 has at least one portion of cord (or segment of cord) in which the metallic wire 21 is not visible since it is entirely covered, or completely surrounded, by the filaments 23 of the multifilament textile yarn 22.

Although the embodiment of FIGS. 2-4 in which the metallic wire 21 is, in at least some of the cross sections of the hybrid reinforcing cord 10', completely embedded in the filaments 23 of the multifilament textile yarn 22 is particularly preferred, embodiments in which, in any cross section of the hybrid reinforcing cord 10', the metallic wire 21 is only partially embedded in the filaments 23 of the multifilament textile yarn 22, and in particular those in which at least 50% of the outer surface of the metallic wire 21 is embedded in the filaments 23 of the multifilament textile yarn 22 are deemed equally preferred.

The metallic wire 21 is made of steel, whereas the filaments 23 of the multifilament textile yarn 22 are made of fibers of aromatic polyamides, or of fibers of aliphatic polyamides, for example Nylon 6, Nylon 6.6, Nylon 4.6, Nylon 4.10, Nylon 10.10, Nylon 11, Nylon 12, Nylon 6.10, Nylon 6.12, or of polyester fibers, for example polybutylene terephthalate (PBT), polyethylene terephthalate (PET), polyethylene isophthalate (PEI), or of polyketone fibers, or of polyvinyl alcohol fibers, or of cellulose fibers, for example rayon or lyocell), or of glass or carbon fibers, or any mixture of the aforementioned fibers, or assemblies of mixed fibers comprising two or more of the materials listed above. In the case of commingled fibers, the fibers of the filaments 23 can for example comprise:

- 50% Aramid with linear density equal to 1100 dtex and 50% PET with linear density equal to 1100 dtex;
- 43% Aramid with linear density equal to 840 dtex and 57% PET with linear density equal to 1100 dtex;
- 33% Aramid with linear density equal to 550 dtex and 67% PET with linear density equal to 1100 dtex.

Irrespective of the specific type of textile material used for the filaments 23 of the multifilament textile yarn 22, such a material is suitably made adhesive on its surface so as to offer an adequate adhesivity to the surrounding elastomeric material. Typically, the adhesive treatment can be carried out by coating with an adhesive substance or by a chemical or physical treatment.

For example, the adhesive treatment is carried out through immersion of the hybrid reinforcing cord 10', after having twisted together the two strands 20, in a solution comprising the adhesive substance. In this case even possible portions of metallic wire 21 that are directly exposed to the surrounding elastomeric material are made adhesive.

The metallic wire 21 preferably has a diameter comprised between 0.10 mm and 0.45 mm, more preferably between 0.15 mm and 0.40 mm depending on the area of the tyre 100 in which the hybrid reinforcing cords 10' are arranged and how much it is preferred for the performance of the tyre 100 to be prioritized with respect to its weight.

The multifilament textile yarn 22 preferably has a linear density comprised between 400 dtex and 4000 dtex, preferably between 800 dtex and 2500 dtex, depending on the material from which it is made and the area of the tyre 100 in which the hybrid reinforcing cords 10' are arranged.

In some preferred embodiments, the metallic wire 21 has a diameter equal to 0.22 mm and the linear density of the multifilament textile yarn 22 is equal to 1680 dtex.

FIGS. 2 and 4 show a hybrid reinforcing cord 10' comprising only two strands 20. However, alternative embodiments are foreseen in which the hybrid reinforcing cord 10' comprises a single strand 20 (in which case the hybrid reinforcing cord 10' will coincide with the strand 20 shown in FIG. 3) or more than two strands 20, for example up to four strands 20.

The strands 20 can be equal to each other, as shown in FIG. 4. In this case, in at least some of the cross sections of the hybrid reinforcing cord 10' the metallic wire 21 of each strand 20 is at least partially embedded in the filaments 23 of the respective multifilament textile yarn 22.

Figure 5:
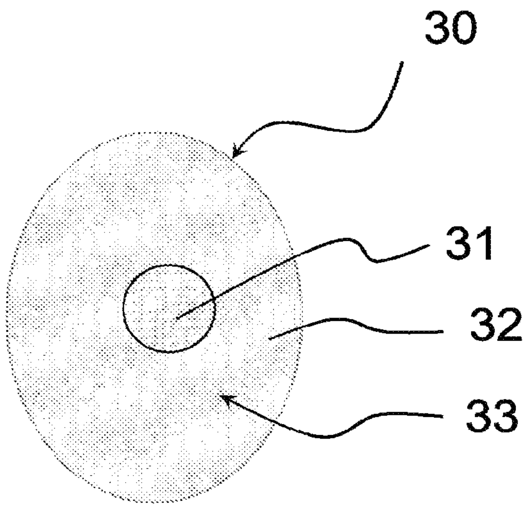
FIG. 5 is an enlarged schematic view of a cross-section of a second strand belonging to an alternative embodiment of the hybrid reinforcing cord of FIG. 2.
Figure 6:
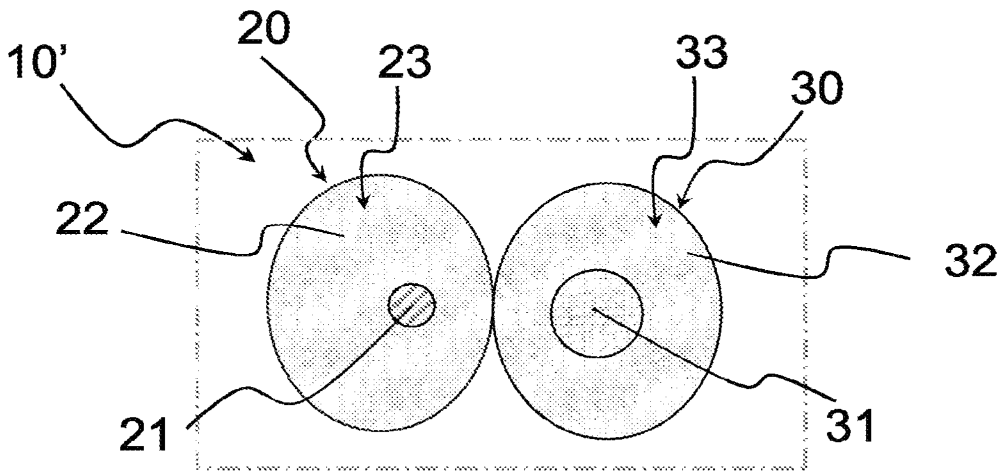
FIG. 6 is an enlarged schematic view of a cross-section of a second embodiment of the hybrid reinforcing cord of FIG. 2 comprising a first strand like that of FIG. 3 and a second strand like that of FIG. 5, such a cross section being taken on the section plane S-S drawn in FIG. 2.

Alternatively, as shown in FIG. 6, one of the two strands of the hybrid reinforcing cord 10' is the same as the strand 20 described above, whereas the other strand is a strand 30 made entirely of textile material, of the type for example shown in FIG. 5.

With reference to FIGS. 5 and 6, the strand 30 comprises a monofilament textile wire 31 twisted to a multifilament textile yarn 32 so that, in at least some of the cross sections of the strand 30 and of the hybrid reinforcing cord 10', the monofilament textile wire 31 is partially embedded in the filaments 33 of the multifilament textile yarn 32.

The twisting pitch of the monofilament textile wire 31 and of the multifilament textile yarn 32 is preferably the same as the twisting pitch P1 of the two strands 20 and 30. Such a twisting pitch P1 is preferably comprised between 1 mm and 20 mm, more preferably between 2 mm and 15 mm, for example equal to 12.5 mm.

As can be seen in the cross sections shown in FIGS. 5 and 6, in at least some of the cross sections of the strand 30 and of the hybrid reinforcing cord 10' the monofilament textile wire 31 is completely embedded in the filaments 33 of the multifilament textile yarn 32.

The strand 30 can comprise more than one monofilament textile wire 31 embedded in the filaments 33 of the multifilament textile yarn 32.

In particular, it is possible to provide up to three monofilament textile wires 31 for each strand 30, preferably up to two monofilament textile wires 31, even more preferably a single monofilament textile wire 31 for each strand 30.

In the embodiment shown in FIGS. 5 and 6, the monofilament textile wire 31 is, in at least some of the cross sections of the strand 30 and of the hybrid reinforcing cord 10', completely embedded in the filaments 33 of the metallic yarn 32 and, therefore, the aforementioned filaments 33 are arranged around the monofilament textile wire 31 so as to completely surround the monofilament textile wire 31.

Therefore, the hybrid reinforcing cord 10' of FIG. 6 has at least one portion (or segment) of cord in which the monofilament textile wire 31 is not visible since it is entirely covered, or completely surrounded, by the filaments 33 of the multifilament textile yarn 32.

Although the embodiment of FIGS. 5-6 in which the monofilament textile wire 31 is, in at least some of the cross sections of the hybrid reinforcing cord 10', completely embedded in the filaments 33 of the multifilament textile yarn 32 is particularly preferred, embodiments in which, in any cross section of the hybrid reinforcing cord 10', the monofilament textile wire 31 is only partially embedded in the filaments 33 of the multifilament textile yarn 32, and in particular those in which at least 50% of the outer surface of the monofilament textile wire 31 is embedded in the filaments 33 of the multifilament textile yarn 32 are deemed equally preferred.

The monofilament textile wire 31 is made of fibers of aliphatic polyamide, for example Nylon 6, Nylon 6.6, Nylon 4.6, Nylon 4.10, Nylon 10.10, Nylon 11, Nylon 12, Nylon 6.10, Nylon 6.12, or polyester fibers, for example polybutylene terephthalate (PBT), polyethylene terephthalate (PET), polyethylene isophthalate (PEI), or polyaryletherketone fibers, for example polyetheretherketone (PEEK), or mixtures thereof.

The filaments 33 of the multifilament textile yarn 32 are preferably made of a material selected among those indicated above with reference to the filaments 23 of the multifilament textile yarn 22 of the strand 20.

The filaments 33 of the multifilament textile yarn 32 are also suitably treated with an adhesive on the surface so as to offer an adequate adhesivity to the surrounding elastomeric material. If the adhesive treatment is carried out through immersion of the hybrid reinforcing cord 10' in a bath containing an adhesive substance after having twisted together the two strands 20 and 30, possible portions of monofilament textile wire 31 that are directly exposed to the surrounding elastomeric material are also made adhesive.

The monofilament textile wire 31 preferably has a diameter comprised between 0.10 mm and 0.70 mm, more preferably between 0.15 mm and 0.50 mm, depending also on the material from which it is made and on the area of the tyre 100 in which the hybrid reinforcing cords 10' are arranged.

The multifilament textile yarn 32 preferably has a linear density comprised between 400 dtex and 4000 dtex, preferably between 800 dtex and 2500 dtex, depending also on the material from which it is made and on the area of the tyre 100 in which the hybrid reinforcing cords 10' are arranged.

In some preferred embodiments, the monofilament textile wire 31 has a diameter equal to 0.40 mm and the linear density of the multifilament textile yarn 32 is equal to 1680 dtex.

Preferably, the multifilament textile yarn 32 of the strand 30 is identical to the multifilament textile yarn 22 of the strand 20.

The monofilament textile wire 31 may or may not be twisted on itself before being twisted to the multifilament textile yarn 32. If twisted on itself, the twist pitch of the monofilament textile wire 31 is preferably the same as the twisting pitch of the monofilament textile wire 31 and of the multifilament textile yarn 32.

The multifilament textile yarn 32 may or may not be twisted on itself before being twisted to said at least one monofilament textile wire 31. If twisted on itself, the twist pitch of the multifilament textile yarn 32 is also preferably the same as the twisting pitch of the monofilament textile wire 31 and of the multifilament textile yarn 32.

Although FIGS. 5 and 6 show a hybrid reinforcing cord 10' comprising two strands 20 and 30, alternative embodiments are foreseen in which the hybrid reinforcing cord 10' comprises a single strand 20 and more than one strand 30, or a single strand 30 and more than one strand 20, or many strands 20 and many strands 30.

Figure 7:
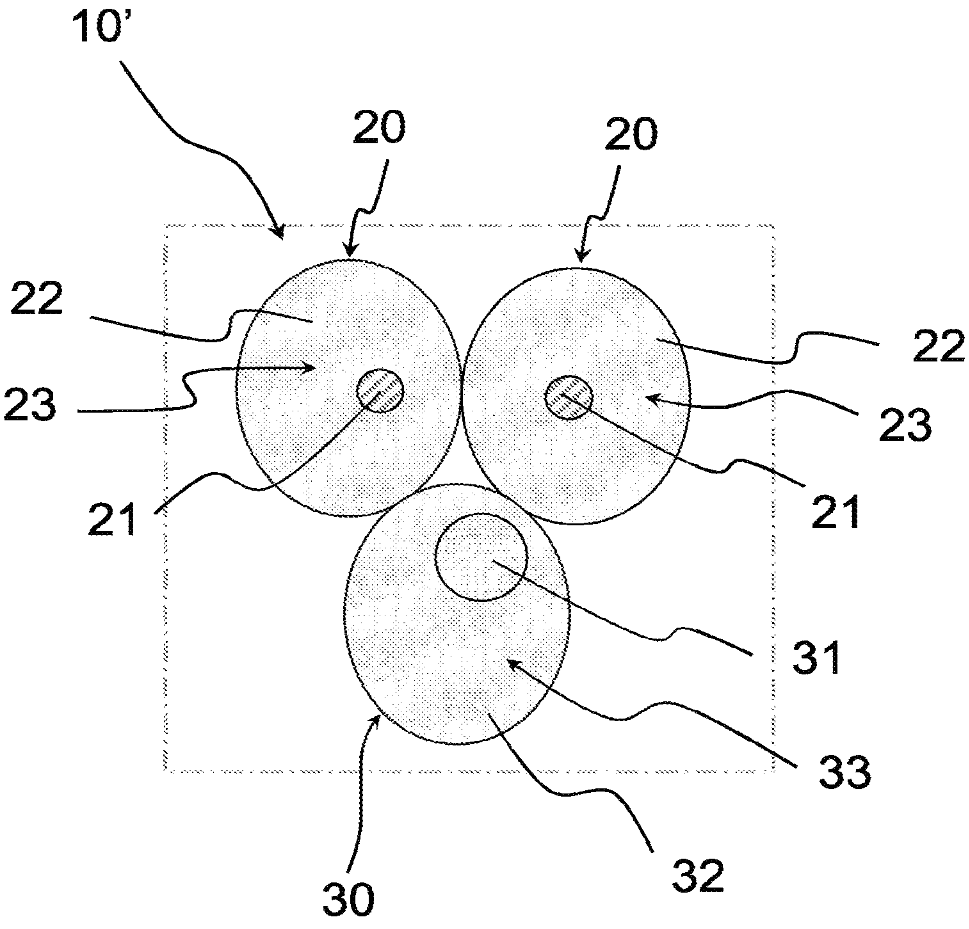
FIG. 7 is an enlarged schematic view of a cross-section of a third embodiment of a hybrid reinforcing cord used in the tyre of FIG. 1.
Figure 8:
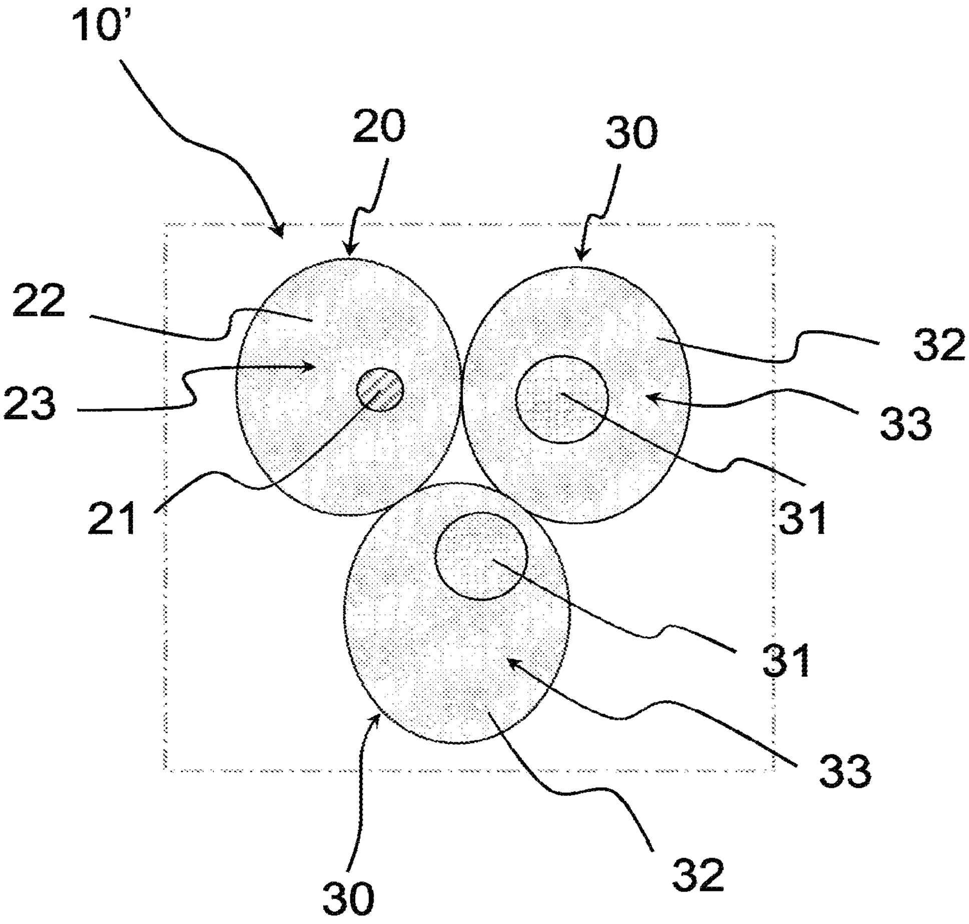
FIG. 8 is an enlarged schematic view of a cross-section of a fourth embodiment of a hybrid reinforcing cord used in the tyre of FIG. 1.

For example, FIG. 7 shows an embodiment of a hybrid reinforcing cord 10' comprising two strands 20 twisted together to a strand 30, whereas FIG. 8 shows a different embodiment of a hybrid reinforcing cord 10' comprising two strands 30 twisted together to a strand 20. The empty space at the center of the hybrid reinforcing cord 10' shown in FIGS. 7 and 8 in reality will be occupied by the filaments 23 and 33 of the multifilament textile yarns 22 and 32.

In the case in which the hybrid reinforcing cord 10' comprises more than one strand 30, the strands 30 can be equal to each other, as shown in FIG. 8. In this case, in at least some of the cross sections of the hybrid reinforcing cord 10' the monofilament textile wire 31 of each strand 30 is at least partially embedded in the filaments 33 of the respective multifilament textile yarn 32.

In specific embodiments, only the reinforcing cords 10*a*, and not also the reinforcing cords 10*b*, 10*c* and 10*e*, or vice-versa, are hybrid reinforcing cords 10' of the type described above.

In other specific embodiments, only the reinforcing cords 10*b*, and not also the reinforcing cords 10*a*, 10*c*, 10*e* or vice-versa, are hybrid reinforcing cords 10' of the type described above.

In some embodiments, only the reinforcing cords 10*b* and/or 10*c*, and not also the reinforcing cords 10*a* and 10*de*, are hybrid reinforcing cords 10' of the type described above.

In yet other embodiments, only the reinforcing cords 10*e*, and not also the reinforcing cords 10*a*, 10*b* and/or 10*c*, are hybrid reinforcing cords 10' of the type described above.

When the reinforcing cords 10*e* are hybrid reinforcing cords 10' of the type described above, such hybrid reinforcing cords 10' can be used only in the flipper 120 (if provided and when the chafer is not provided or is provided and comprises non-hybrid reinforcing cords), only in the chafer 121 (if provided and when the flipper is not provided or is provided and comprises non-hybrid reinforcing cords), or both in the flipper 120 and in the chafer 121 (if both of them are provided).

In particularly preferred embodiments, the hybrid reinforcing cords 10' are used at least in the belt layers 1061, 1062 of the crossed belt structure 106.

In some embodiments, the reinforcing layers in which the hybrid reinforcing cords 10' are provided comprise only hybrid reinforcing cords 10'.

In other embodiments, the reinforcing layers in which the hybrid reinforcing cords 10' are provided are mixed reinforcing layers that comprise, in addition to the aforementioned hybrid reinforcing cords 10', hybrid textile reinforcing cords 10" of the type for example described below with reference to FIGS. 9-12.

Figure 9:
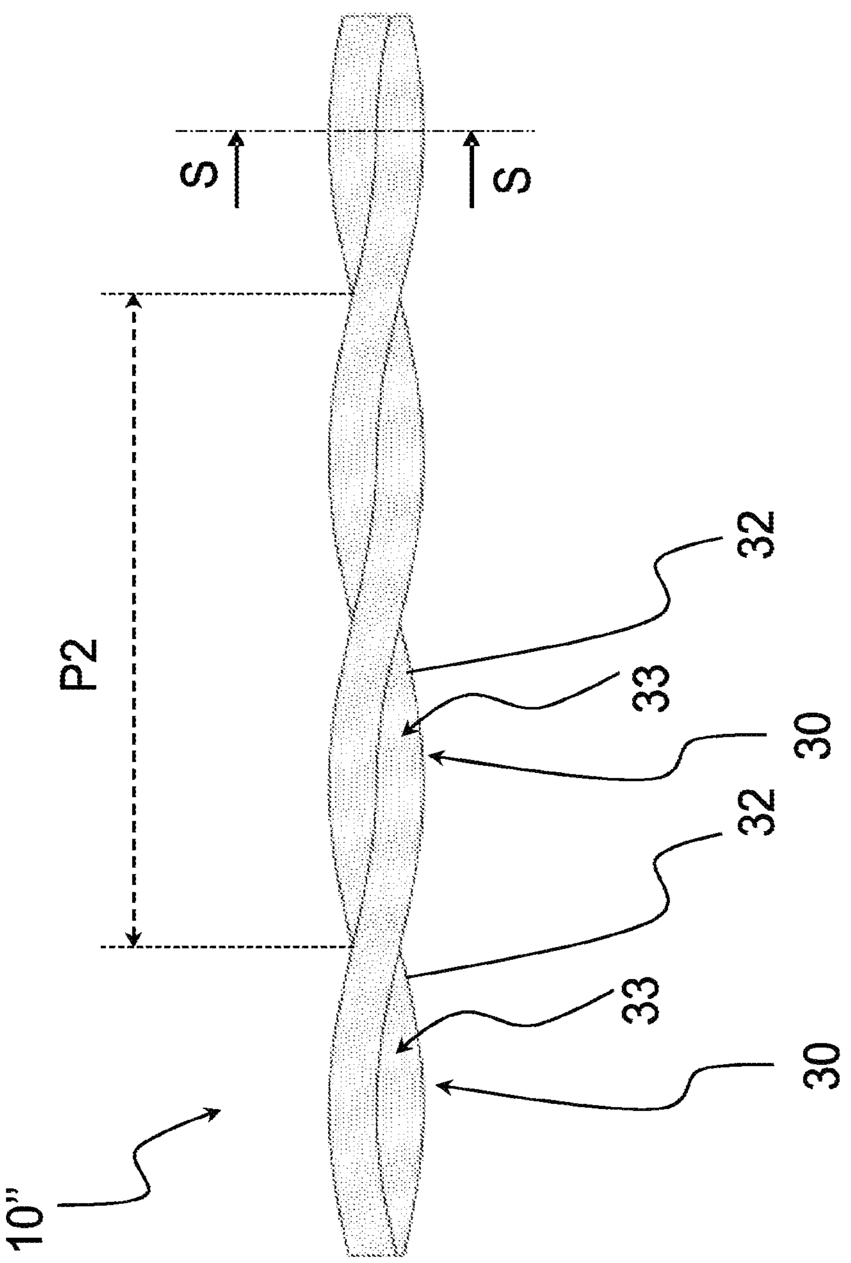
FIG. 9 is a schematic side view of a segment of an embodiment of a hybrid textile reinforcing cord which can be used in the tyre of FIG. 1.
Figure 10:
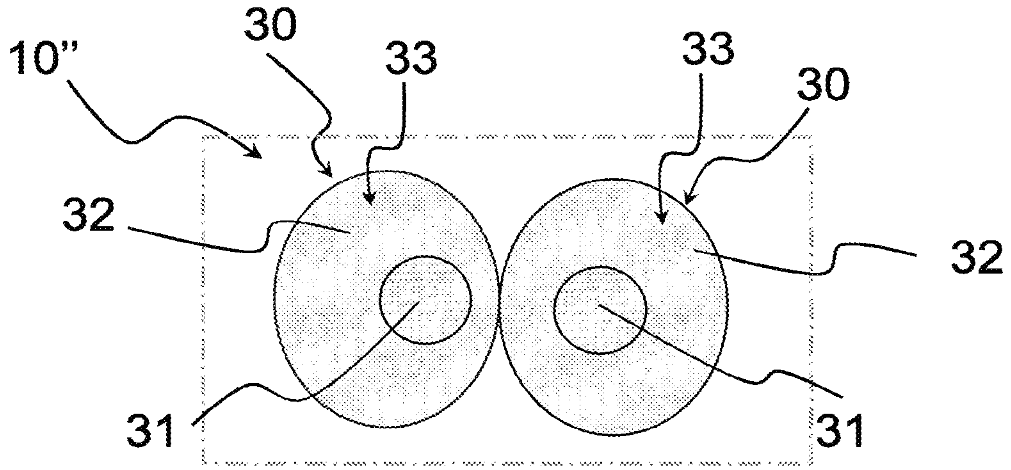
FIG. 10 is an enlarged schematic view of a cross-section of the hybrid reinforcing cord of FIG. 9, such a cross section being taken on the section plane S-S drawn in FIG. 9.

In the specific example shown in FIGS. 9 and 10, the hybrid textile reinforcing cord 10" comprises only textile strands. In particular, the hybrid textile reinforcing cord 10" comprises two strands 30 identical to the strands 30 described above with reference to FIGS. 5-8. Therefore, what has been described above with respect to the strands 30 of the hybrid reinforcing cords 10' of FIGS. 5-8 is also valid for the strands 30 of the hybrid textile reinforcing cords 10".

The two strands 30 are twisted to one another with a twisting pitch P2 that preferably is identical to the twisting pitch P1 described above.

Preferably, the two strands 30 are identical to one another.

FIG. 10 shows an embodiment of a hybrid textile reinforcing cord 10" in which the monofilament textile wires 31 of the two strands 30 are not twisted on themselves.

Figure 11:
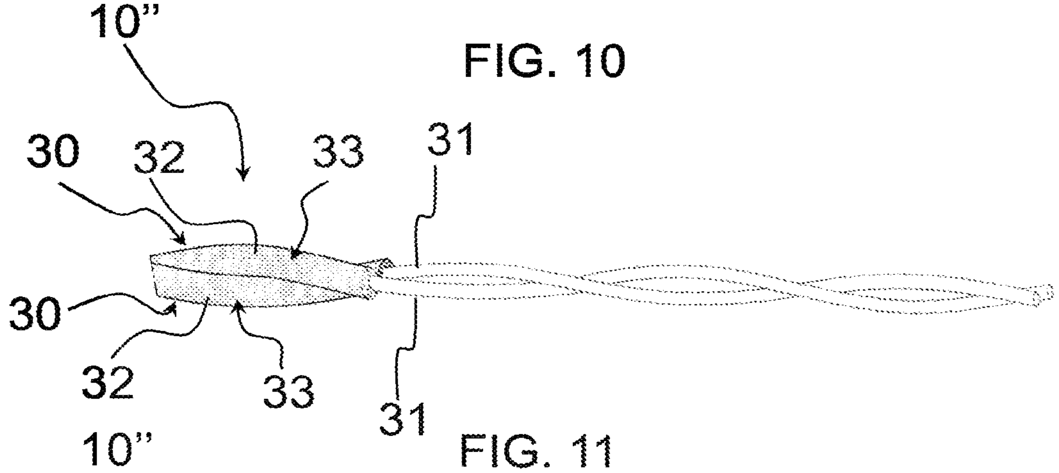
FIG. 11 is a schematic perspective view of the hybrid textile reinforcing cord of FIG. 9, in which part of its components have been removed to show other components that otherwise would be hidden.
Figure 12:
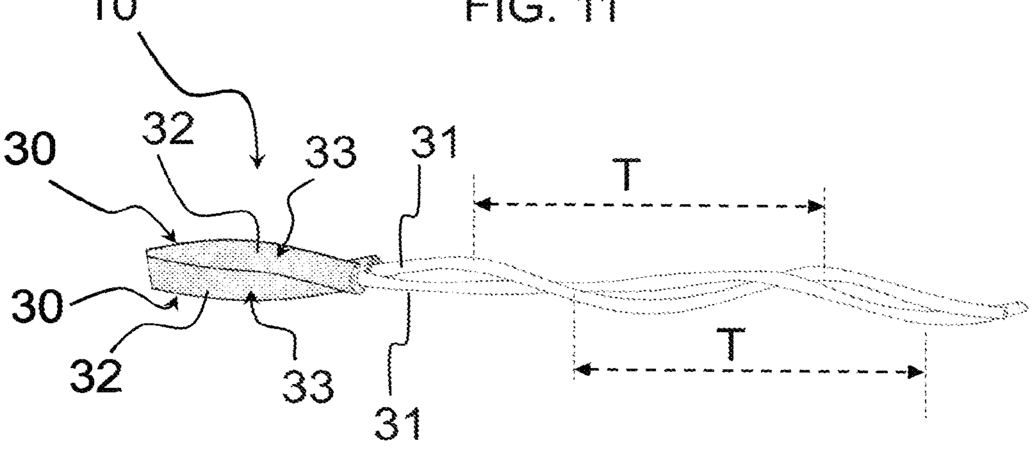
FIG. 12 is a schematic perspective view of an alternative embodiment of the hybrid textile reinforcing cord of FIG. 9, in which part of its components have been removed to shown other components that otherwise would be hidden.

FIG. 11 shows an embodiment of a hybrid textile reinforcing cord 10" in which the monofilament textile wires 31 of the two strands 30 are twisted on themselves with a predetermined twist pitch T.

Preferably, the twist pitch T is the same as the twisting pitch P2.

The direction of the twisting of the monofilament textile wires 31 can be the same as or opposite to the twisting direction of the two strands 30.

FIGS. 9-12 show a hybrid textile reinforcing cord 10" comprising only two strands 30. However, alternative embodiments are foreseen in which the hybrid textile reinforcing cord 10" comprises a single strand 30 (in which case the hybrid textile reinforcing cord 10" will coincide with the strand 30 shown in FIG. 5) or more than two strands 30, for example up to four strands 30.

The reinforcing layer in which the hybrid reinforcing cords 10' and possibly the hybrid textile reinforcing cords 10" are provided preferably has a thread count comprised between 50 cords/dm and 100 cords/dm, more preferably between 60 cords/dm and 85 cords/dm.

Such a reinforcing layer preferably has a thickness comprised between 0.7 mm and 1.6 mm, more preferably between 0.9 mm and 1.3 mm.

Figure 13:
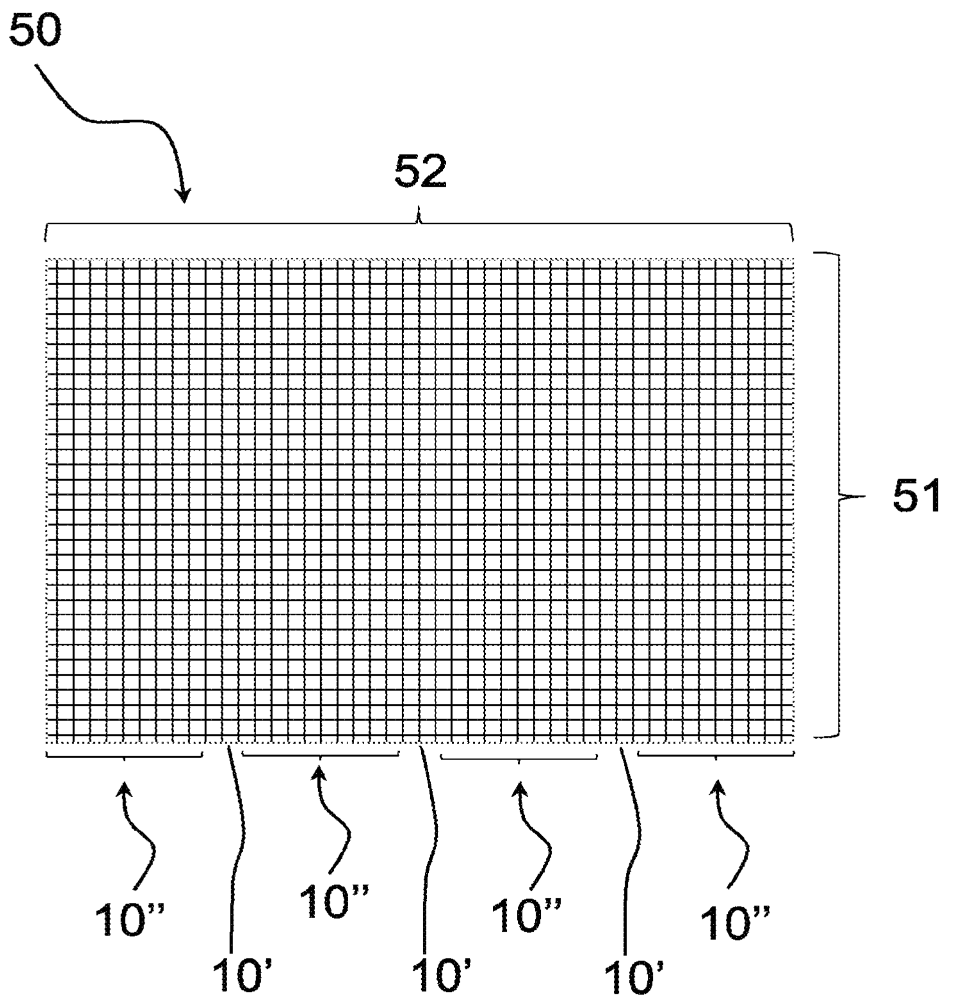
FIG. 13 is a schematic plan view of a preferred embodiment of a fabric comprising hybrid reinforcing cords like for example that of FIG. 2 and hybrid textile reinforcing cords like for example that of FIG. 9.

The hybrid reinforcing cords 10' and the hybrid textile reinforcing cords 10" can form part of a fabric 50, like for example the one shown in FIG. 13.

The fabric 30 comprises a plurality of elongated weft elements 51 (schematized by vertical lines in FIG. 13) and a plurality of elongated warp elements 52 (schematized by horizontal lines in FIG. 13).

The elongated weft elements 51 are made of nylon or cotton.

The elongated warp elements 52 can be defined solely by the aforementioned hybrid reinforcing cords 10' or, as shown in FIG. 13, by both the aforementioned hybrid reinforcing cords 10' and the aforementioned hybrid textile reinforcing cords 10", to define a "mixed" fabric 50 in this case.

In particular, in the embodiment shown in FIG. 13 a hybrid reinforcing cord 10' is provided every nine hybrid textile reinforcing cords 10". However, fabrics 50 are foreseen in which every hybrid reinforcing cord 10' is interposed between two hybrid textile reinforcing cords 10" or is arranged after a predetermined number of hybrid textile reinforcing cords 10" that can be lower than or equal to 30.

The fabric 50 is intended to be embedded in an elastomeric material in a subsequent calendaring step to define the aforementioned reinforcing layer.

In a preferred embodiment of the fabric 50, each of the hybrid reinforcing cords 10' comprises three strands twisted together, and in particular:

- two strands 30 each comprising a monofilament textile wire 31 of PET having a diameter equal to 0.40 mm and a multifilament textile yarn 32 of PET having a linear density equal to 1680 dtex;
- a strand 20 comprising a metallic wire 21 of steel having a diameter equal to 0.22 mm and a multifilament textile yarn 22 of PET having a linear density equal to 1680 dtex.

Such hybrid reinforcing cords 10' thus have a construction of the type (Steel 0.22+PET 1680)+(PET 0.40 mm+PET 1680)×2. The diameter of such hybrid reinforcing cords 10' is equal to about 0.93 mm. Hereinafter, such a cord is indicated as CORDINV1.

In the aforementioned embodiment of the fabric 50, each of the hybrid textile reinforcing cords 10" comprises three strands 30 twisted together, each of them comprising a monofilament textile wire 31 of PET having a diameter equal to 0.40 mm and a multifilament textile yarn 32 of PET having a linear density equal to 1680 dtex.

Such hybrid textile reinforcing cords 10" thus have a construction of the type (PET 0.40 mm+PET 1680)×3. Hereinafter, such a cord is indicated as CORD2.

The Applicant has verified that the increase of weight of the tyre due to the provision in the crossed belt structure 106 of a fabric 50 as described above with respect to a corresponding tyre having, in the belt structure 106, monofilament textile yarns instead of metallic wires, does not exceed 10 gr. and therefore is absolutely acceptable in cases in which an improvement of the performance is sought and it is wished to achieve the processability in current industrial tyre production plants.

Comparative Tests

The Applicant has carried out comparative tests between a cord CORDINV1, a cord CORD2, a conventional metallic reinforcing cord comprising two steel wires of 0.28 mm, used in the crossed belt structures of sports tyres commercialized by the Applicant (hereinafter indicated as CORD1), a hybrid reinforcing cord 10' that differed from CORDINV1 only in that it comprises two strands 20 and a strand 30 (hereinafter indicated as CORDINV2) and a hybrid reinforcing cord 10' that differed from cord CORDINV1 only in that it comprises three strands 20 and no strand 30.

Table 1 below shows the diameter and the weight of the aforementioned reinforcing cords.

TABLE 1

| | CORD 1 | CORD2 | CORDINV1 | CORDINV2 | CORDINV3 |
|---|---|---|---|---|---|
| Cord diameter [mm] | 0.60 | 1.15 | 0.16 | 1.06 | 0.90 |
| Cord weight [g/m] | 0.96 | 1.08 | 1.20 | 1.34 | 1.43 |

It has been possible to note how as the number of metallic wires (CORDINV1, CORDINV2 and CORDINV3) increases compared to the number of monofilament textile wires present in the hybrid reinforcing cord 10', the diameter of such reinforcing cords decreases. This is due to the fact that the metallic wires used have a diameter (equal to 0.22 mm) smaller than the diameter of the monofilament textile wires (equal to 0.40 mm). In any case, the diameter of the hybrid reinforcing cords 10'(CORDINV1, CORDINV2 and CORDINV3) remains substantially equal to or lower than that of the hybrid textile reinforcing cords 10" (CORD2). Therefore, a fabric 50 comprising both hybrid reinforcing cords 10' and hybrid textile reinforcing cords 10" does not have noticeable irregularity caused by the presence of different reinforcing cords.

It has also been possible to note how as the number of metallic wires in the hybrid reinforcing cords 10' (CORDINV1, CORDINV2 and CORDINV3) increases compared to the conventional metallic reinforcing cords (CORD1) the weight of the reinforcing cord increases. Such an increase in weight nevertheless remains extremely small and is therefore totally acceptable, particularly in the case in which it is preferred to prioritize the performance of the tyre with respect to a more limited increase in weight, like that which would be obtained in the case in which only hybrid textile reinforcing cords 10" (CORD2) are used.

In order to evaluate the suitability of the hybrid reinforcing cords 10' described above for their use in the belt structure, the reinforcing cords described above were subjected to traction tests (to evaluate the breaking load) and bending or vertical rigidity tests (to evaluate the ability to withstand to bending stresses).

The traction tests were carried out according to method BISFA E6 (The International Bureau For The Standardization Of Man-Made Fibres, Internationally Agreed Methods For Testing Steel Tyre Cords, 1995 edition).

In the rigidity tests, all of the reinforcing cords described above were subjected to a ring compression test as follows: the reinforcing cords were treated with an adhesive substance and subsequently folded so as to join the opposite ends to create respective rings having a diameter of 80 mm. Such rings were subjected to an initial pretensioning of 0.5 N and to a crushing of 25 mm, with a compression speed of 100 mm/min.

The results of such tests are given in Table 2 below.

TABLE 2

| | CORD1 | CORD2 | CORDINV1 | CORDINV2 | CORDINV3 |
|---|---|---|---|---|---|
| Breaking load [N] | 405 | 450 | 380 | 400 | 470 |
| Rigidity [N] | 0.13 | 0.06 | 0.09 | 0.10 | 0.11 |

It has been possible to note how the hybrid reinforcing cords 10' (CORDINV1, CORDINV2, CORDINV3) have values of breaking load and rigidity that are absolutely comparable with those of the conventional metallic reinforcing cords (CORD1), approaching the values of the latter as the number of metallic wires provided in the hybrid reinforcing cords 10' increases.

The aforementioned tests therefore have confirmed the suitability of the hybrid reinforcing cords 10' of the present invention to being used in the belt structures of the tyres.

The present invention has been described with reference to some preferred embodiments. Different modifications can be made to the embodiments described above, still remaining within the scope of protection of the invention which is defined by the following claims.

The invention claimed is:

1. A tyre for vehicle wheels comprising:

a support structure and a tread band arranged in a radially outer position with respect to the support structure, wherein the support structure comprises at least one reinforcing layer, the at least one reinforcing layer comprising a plurality of hybrid reinforcing cords, wherein each hybrid reinforcing cord of the plurality of hybrid reinforcing cords comprises at least one first strand including at least one metallic wire made of steel and a multifilament textile yarn comprising a first multifilament textile yarn including a plurality of filaments, and wherein, in any cross section of at least some of the plurality of hybrid reinforcing cords, the at least one metallic wire is at least partially embedded in the filaments of the first multifilament textile yarn.

2. The tyre according to claim 1, wherein at least some of the plurality of hybrid reinforcing cords comprise at least one portion of cord at which the at least one metallic wire is completely surrounded by the filaments of the first multifilament textile yarn.

3. The tyre according to claim 1, wherein at least some of the plurality of hybrid reinforcing cords comprise n first hybrid strands twisted together and each including x metallic wires, wherein n is a number ranging between 1 and 4 and x is a number ranging between 1 and 3.

4. The tyre according to claim 1, wherein the at least one first strand is twisted together with at least one second strand, wherein the at least one second strand comprises at least one monofilament textile wire twisted together with a second multifilament textile yarn comprising a plurality of filaments, wherein, in any cross section of the at least one second strand, the at least one monofilament textile wire is at least partially embedded in the filaments of the second multifilament textile yarn.

5. The tyre according to claim 4, wherein at least some of the plurality of hybrid reinforcing cords comprise m second strands twisted together with the at least one first strand and each of the m second strands comprises y monofilament textile wires, wherein m is a number ranging between 1 and 4 and y is a number ranging between 1 and 3.

6. The tyre according to claim 1, wherein the at least one metallic wire has a diameter ranging between 0.10 mm and 0.45 mm and the first multifilament textile yarn has a linear density ranging between 400 dtex and 4000 dtex.

7. The tyre according to claim 1, wherein the filaments of the first multifilament textile yarn are made of fibers chosen from fibers of aromatic polyamides, fibers of aliphatic polyamides, polyester fibers, polyketone fibers, polyvinyl alcohol fibers, cellulose fibers, glass fibers, carbon fibers, and mixtures thereof.

8. The tyre according to claim 1, wherein the plurality of hybrid reinforcing cords belongs to a fabric having a plurality of elongated weft elements and a plurality of elongated warp elements.

9. The tyre according to claim 8, wherein at least some of the plurality of hybrid reinforcing cords belong to the plurality of elongated warp elements.

10. The tyre according to claim 1, wherein the at least one reinforcing layer comprises a plurality of hybrid textile reinforcing cords, wherein each hybrid textile reinforcing cord of the plurality of hybrid textile reinforcing cords comprises at least one respective strand, wherein the at least one respective strand comprises at least one monofilament textile wire twisted together with a respective multifilament textile yarn comprising a plurality of filaments, wherein, in any cross section of at least some of the plurality of hybrid textile reinforcing cords, the at least one monofilament textile wire is at least partially embedded in the filaments of the respective multifilament textile yarn.

11. The tyre according to claim 10, further comprising a fabric having a plurality of elongated weft elements and a plurality of elongated warp elements, wherein at least some of the plurality of hybrid textile reinforcing cords belong to the plurality of elongated warp elements.

12. The tyre according to claim 11, wherein the fabric comprises at least one of the hybrid reinforcing cords every z hybrid textile reinforcing cords, wherein z is a number ranging between 1 and 30.

13. The tyre according to claim 1, wherein the support structure comprises:

a carcass structure comprising at least one carcass layer having opposite end edges turned around respective annular anchoring structures to define, on opposite sides with respect to an equatorial plane (M-M) of the tyre, respective bead structures;

a crossed belt structure arranged in a radially outer position with respect to the carcass structure and in a radially inner position with respect to the tread band;

wherein the at least one reinforcing layer belongs to at least one of:

the at least one carcass layer;

at least one belt layer of the crossed belt structure;

at least one stiffening layer associated with the at least one carcass layer at or close to a respective turned end edge.

* * * * *